United States Patent [19]

Takagi

[11] Patent Number: 5,053,808
[45] Date of Patent: Oct. 1, 1991

[54] IMAGE FORMING APPARATUS

[75] Inventor: Atsushi Takagi, Ashigara, Japan

[73] Assignee: Fuji Photo Film Co., Ltd., Kanagawa, Japan

[21] Appl. No.: 413,557

[22] Filed: Sep. 27, 1989

[51] Int. Cl.$^5$ .............................................. G03B 27/73
[52] U.S. Cl. ........................................ 355/38; 355/68; 355/77; 355/327
[58] Field of Search ...................... 355/38, 68, 69, 214, 355/311, 326, 327; 356/444, 404

[56] References Cited

U.S. PATENT DOCUMENTS

| 3,796,060 | 1/1989 | Mizude | 355/214 X |
|---|---|---|---|
| 4,731,671 | 3/1988 | Alkofer | 355/38 X |
| 4,745,465 | 5/1988 | Kwon | 355/38 X |
| 4,829,371 | 5/1989 | Hiramatsu et al. | 355/38 X |
| 4,830,501 | 5/1989 | Terashita | 356/404 X |
| 4,860,059 | 8/1990 | Terashita | 355/38 |

FOREIGN PATENT DOCUMENTS 63-232681  9/1988  Japan .

Primary Examiner—L. T. Hix
Assistant Examiner—D. Rutledge
Attorney, Agent, or Firm—Sughrue, Mion, Zinn, Macpeak & Seas

[57] ABSTRACT

The improved image forming apparatus with a capability for automatically identifying the type of originals measures the reflected light from an original of interest with at least two sensors for the light of at least one of three primary colors, constructs a discriminant function that makes use of the differences in spectral reflection density between originals and which uses as parameters all the values of measurements obtained or with the higher and lower values being cut off, and automatically identifies the type of the original by discriminating color photographic originals from another type of originals such as color printed originals or black-and-white originals on the basis of the value of said discriminant function. The image forming apparatus may measure the reflected light from the original with sensors for the light of three primary colors and identify a low-density, low-constant original by means of a predetermined discriminant formula. Based on the results of such identification, the image forming apparatus selects the proper light-sensitive materials and exposure conditions according to the type of original of interest or the low-density, low-constant to original to be used and performs appropriate image formation.

In spite of the use of a simple discriminant function or formula, the image forming apparatus is capable of correct identification of the type of original whether its size is regular or irregular as in the case of small-size documents or bulky materials, thereby allowing for appropriate image formation.

20 Claims, 11 Drawing Sheets

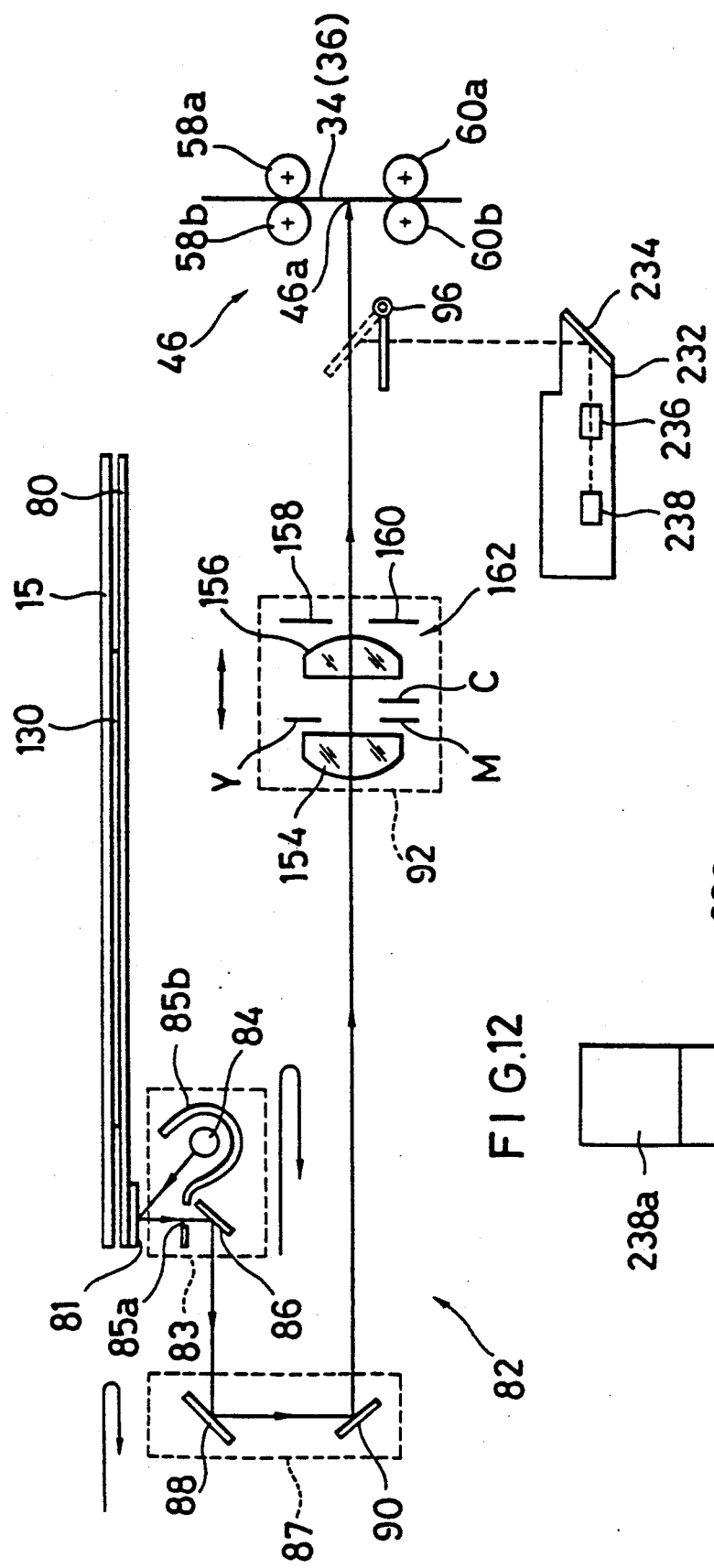

IMAGE FORMING APPARATUS

BACKGROUND OF THE INVENTION

1. Field of the Invention

The present invention relates to an image forming apparatus. More particularly, the present invention relates to an image forming apparatus that is capable of accurately distinguishing color photographic originals at least from color printed originals or black-and-white originals and which forms image according to the so distinguished type of original. The present invention also relates to an image forming apparatus capable of achieving faithful color density reproduction even from low-density, in particular, low-density low-contrast originals.

2. Prior Art

Image forming apparatus including various copiers capable of duplicating color originals, as well as color image printers are gaining increasing popularity these days.

In order to produce satisfactory color image with these color image forming apparatus, good balance must be attained not only in colors but also in densities.

With most of these image forming apparatus, in particular, color copiers, photographs and printed matter are used as color originals. However, different colorants are used in photographs and printed matter. Further, they have different spectral luminous efficiencies and require the use of copying materials having different spectral sensitivities. On account of these differences, the images of copies from photographic originals have had a different color balance than those from printed originals if they are duplicated under the same copying conditions. For example, color printed originals have a great overlap between the spectral density distributions of magenta and cyan inks. Thus, color printed originals have a high magenta density and color copiers that are adjusted to produce good copies of color printed originals are to be operated under copying conditions that provide suppressed magenta density. Therefore, if color photographic originals are duplicated under such image forming conditions, the production of magenta color is so limited as to form color copied images of green shades.

Color printed originals and color photographic originals also differ in the gradation of their image, so that if color photographic originals are duplicated on contrasty light-sensitive materials (i.e., those which are optimal for duplicating color printed originals) with copiers that employ silver halide photographic materials and various other light-sensitive materials, medium tone will not be effectively reproduced and only hard images will result. Therefore, in order to obtain an image of good quality with a single unit of image forming apparatus according to various types of color originals, it is necessary to identify the type of original to be duplicated and to select the proper image forming conditions (e.g. the amount by which color filters are adjusted and the amount of exposure) and the right kind of light-sensitive material according to the type of said original. However, this problem has not been fully considered in the design of prior art image forming apparatuses and if image forming conditions and light-sensitive materials are not changed in a single unit of image forming apparatus according to the type of original, it is impossible to obtain satisfactory image from either color printed originals or color photographic originals.

An image forming apparatus has also been proposed that enables the operator to manipulate selection keys according to such criteria as the presence or absence of halftone dots, thereby selecting appropriate image forming conditions that are optimal for the particular type of color original. However, the recent advances in color printing technology are so great that it is considerably difficult for unskilled operators to make accurate identification as to whether the original of interest is a color picture of the color printed matter obtained from color pictures. Further, the image forming process by operators is far from being efficient.

There have also been proposed several methods for identifying various types of color originals by means of image readers, as well as image forming apparatus that have such identifying means. However, in most identifying methods proposed so far, a plurality of functions involving measured values obtained from the image reader must be used in combination in order to identify the specific type of a color original of interest. In addition to this problem of complexity and difficulty in control, a further improvement is required of the precision that can be attained in the results of identification.

Prior art image forming apparatuses that are intended to duplicate color originals have various kinds of light-sensitive materials in stock that are optimal for the specific types of color originals to be duplicated but they are not usually furnished with light-sensitive materials dedicated to black-and-white originals and instead they form black-and-white image on color light-sensitive materials. Thus, standard exposure conditions that are optimal for black-and-white originals such as black-and-white photographs and printed matter have not been fully taken into account in the design of image forming apparatus of the type described above. As a result, if a black-and-white original is duplicated on a low-contrast, light-sensitive material that is optimal for duplicating color photographic originals (which is hereunder referred to as a "soft light-sensitive material"), the copied image will have a red shade as in the case where color printed originals are duplicated on soft light-sensitive materials and no satisfactory black-and-white copied image can be obtained. This is true whether the black-and-white original is a photograph or printed matter. It has therefore been desired to develop an apparatus that is capable of distinguishing color photographic originals not only from color printed originals but also from black-and-white originals.

In prior art image forming apparatus, the photometric region of the same length as, for example, the size of the light-sensitive material on which image is to be formed is often scanned either during prescanning or before reading the necessary information from the original of interest. All the data thus read are used to perform mathematical operations, thereby identifying the type of original to be duplicated. If, under these circumstances, the size of document to be copied is smaller than a predetermined area of the platen glass or the area of photometric region which is equal to the light-sensitive material of interest as in the case of copying color documents of small size, in particular, making enlarged copies of color prints of size E (82 mm×116 mm) or copying color documents of irregular sizes, or if the document is not properly placed on the platen glass, the document illuminating light that passes through the platen glass on a position way off the document during photometric scanning of the document surface is sometimes reflected by the white underside of the top cover to be directly launched into sensors. As a result, even the white area of the top cover is read as part of the image of document and subjected to mathematical operations. This can cause failure to correctly identify the document type and the color photographic original is detected either as a color printed original or as an intermediate original containing both color photographic and printed images.

A need sometimes arises to copy a bulky material such as a package or commercial goods with the top cover left open or to copy a certain page or pages of a thick book placed face down on the platen glass, again with the top cover left open. In these cases as well the case where the color document to be copied is smaller than the light-sensitive material on which image is to be formed, the following big problems will inevitably occur. If the document to be copied has a smaller image forming area than the photometric region or is a thick book that forms a large hollow portion around it or along the center margin which should inherently belong to the document region, the document illuminating light will pass unimpeded through the photometric region where no document is present or through the area of the platen glass corresponding to said hollow portion. If this occurs in the copying process, an area that hardly produces reflected light will occur in part of the document region which is inherently supposed to receive some reflected light. In other words, the occurrence of this phenomenon allows sensors to read such defective region as one of very high density and if mathematical operations for identification are performed on the basis of the resulting data, one often fails to identify the correct document type.

Some versions of the prior art image forming apparatus are capable of selecting an optimum light-sensitive material and setting optimum standard exposure conditions according to the document type identified by the conventional methods described above, and then performing exposure under said standard conditions to form image. With such color image forming apparatus, in particular, color copiers, color image forming conditions are initially set at the time of system installation or thereafter adjusted periodically so as to insure the formation of reproduced image having colors and densities faithful to the image of color original. With silver halide color image forming apparatus, photographic documents which require faithful reproduction of medium tone are copied on soft (low contrast) light-sensitive materials having comparatively low gamma-characteristics whereas printed documents which also require good contrast are copied on normal (contrasty) light-sensitive materials having comparatively high gamma-characteristics. In addition, the color image forming conditions are varied in such a way as to optimize the densities and color reproduction that are required for ideal image reproduction.

Color reflection type originals generally have a gamut of various densities and colors, so the average density of either the whole document or the image areas of the document is detected from the image of document and correction is made in such a way as to provide satisfactory color reproduction for the detected average density. If, in the case where image is to be formed on a light-sensitive material having the characteristics shown by curve a in FIG. 15, the overall density (e.g. average density) Do of a color printed original is found to be equal to Dc, the overall color density Dp of a reproduced image is equal to Da. Since Da>Dc, in order to provide satisfactory color density reproduction, the characteristic curve a of the light-sensitive material is laterally shifted until Dp becomes equal to Dc. In other words, density correction is effected in such a way that when the density of original image Do is Dc, the density of reproduced image Dp is equal to Db (=Dc).

On the other hand, most black-and-white copiers are so designed that background areas of light colors and the nearly white background are rendered white by eliminating the light colors through proper density correction typically exemplified by an increase in the quantity of light.

Most frequently used color reflection type originals are such that many of the image areas present have densities equal to the average density but even documents having an overall dark density sometimes contain characters of lighter density or areas of medium density. If such documents are read for density correction, not only the dark areas but also the areas of light and medium density are scanned simultaneously and the document of interest is judged to be a dark document. Accordingly, density control is effected in such a way as to reproduce a darker image on the dark document. A problem with this approach of control for density correction is that although colors of high density are reproduced satisfactorily, colors in the low-density areas are skipped.

Conversely, if documents that have a low average density but which exhibit high contrast between a wide area of the white background and characters are corrected to produce a darker density by reducing the amount of light, fogging occurs in the white background which hence does not become snow-white.

Normal contrasty light-sensitive materials usually have comparatively high gamma-values and their characteristic curve has a large gradient that departs from the straight line of $\gamma=1$ in FIG. 15. Reproduction with such materials is poor in the low-density areas. To cope with this problem, documents having an overall low density may be controlled in such a way that the quantity of light is not reduced to effect compensation for color densities. However, with documents such as maps that have an overall low density but which have background areas of relatively high density and light colors, if density correction is performed in such a way as to eliminate the color of background areas by increasing the quantity of light (i.e., the type of correction method employed with black-and-white copiers) or if the amount of light is not sufficiently reduced to effect compensation for color densities, the background areas will not assume a full color and will instead remain white, with consequent formation of an image that poorly reproduces colors in the low-density areas. With contrasty normal light-sensitive materials, satisfactory color reproduction is possible if the original is printed matter but no satisfactory colors can be produced in the low-density areas.

Thus, prior art image forming apparatuses which are incapable of distinguishing low-density originals with a wide area of the white background from low-density, low-contrast originals such as maps having background areas of high relatively density and light colors have failed to automatically produce images with efficient reproduction of color densities from either type of originals.

SUMMARY OF THE INVENTION

The first and principal object, therefore, of the present invention is to solve the aforementioned problems of the prior art by providing an image forming apparatus that accurately distinguishes, by a simple method, color photographs at least from color printed matter when the document is a color original, or distinguishes black-and-white originals at least from color photographs and which hence is capable of forming image under optimal conditions according to the identified type of original.

A second object of the present invention is to provide an image forming apparatus of a type that performs prescanning over a length corresponding to the size of light-sensitive material used and which is capable of accurately distinguishing color photographic originals at least from color printed originals or black-and-white originals, thereby forming appropriate image according to the detected type of original even if the document to be copied is smaller than the range of photometry by prescanning (e.g. in the case where enlarged copies of small-size documents, say, prints of size E are made or where documents of irregular sizes are copied) or even if thick books, packages and other bulky materials are copied with the top cover of the copier being left open.

A third object of the present invention is to provide an image forming apparatus which automatically makes distinction between low-density originals with a wide area of the white background and low-density, low-contrast originals with background areas of relatively high density on the basis of color density distributions obtained from information read from the image of original and which is capable of compensating for color densities in such a way as to provide an optimum quantity of light for each of the documents to be processed.

The present inventors conducted various studies in order to attain the three objects described above and found the following: 1) the spectral reflection density of a color photographic image represented by curve 2 in FIG. 1 has a distinguishable difference from the spectral reflection density of a color printed image represented by curve 3; 2) the spectral reflection density of a black-and-white image represented by curve 4 is similar to the spectral reflection density of a color printed image but is different from the spectral reflection density of a color photographic image whether the black-and-white image is a photographic or printed image; 3) therefore, at least a black-and-white image or a color printed image can be precisely distinguished from a color photographic image by means of a discriminant function; 4) an appropriate image can be obtained by effecting image formation according to the type of original identified by the discriminant function; and 5) appropriate black-and-white image with no color shade could be obtained when image formation was effected using a light-sensitive material and standard exposure conditions that were optimal for the reproduction of color printed image. The present invention has been accomplished on the basis of these findings.

According to its first aspect, the present invention provides an image forming apparatus having at least two sensors for the light of at least one of three primary colors for measuring the reflected light from an original, said sensors having sensitivity peaks at different wavelengths within the wavelength region of the light of said at least one primary color, the type of said original being identified by the values of measurements with said sensors, and image being formed in accordance with the so identified type of original. Identification of said original is performed in such a way that at least color photographic originals are distinguished from another type of originals by the value of a discriminant function that uses said plural values of measurements as parameters.

According to its second aspect, the present invention provides an image forming apparatus which measures the reflected light from a predetermined region of photometry including an original and which distinguishes at least color photographic originals from another type of originals on the basis of the obtained values of photometric measurements, with image being formed in accordance with the identified type of original. Mathematical operations for identifying the type of original are performed with photometric values below a predetermined low level and/or those values exceeding a predetermined high level being excluded from said values of photometric measurements.

In a preferred embodiment of each aspect, said another type of originals is a color printed original or a black-and-white original.

In another preferred embodiment of each aspect, said original is a color original and said another type of originals is a color printed original.

In still another preferred embodiment of the first aspect, a total of six sensors are used, two being dedicated to each of the three primary colors.

In still another preferred embodiment of the second aspect, said region of photometry is the range over which the platen glass carrying the original is prescanned.

In a further preferred embodiment of the second aspect, said values of photometric measurements are obtained by using, for the light of at least one of the three primary colors, at least two sensors having sensitivity peaks at different wavelengths within the wavelength region of the light of one primary color.

In yet another preferred embodiment of the second aspect, said values of photometric measurements are obtained with a total of six sensors, two of which are dedicated to each of the three primary colors.

In a further preferred embodiment of each aspect, the six sensors consist of two sensors having sensitivity peaks at $400\pm30$ nm and $450\pm30$ nm within the wavelength region of the blue light, two sensors having sensitivity peaks at $540\pm15$ nm and $570\pm15$ nm within the wavelength region of the green light, and two sensors having sensitivity peaks at $630\pm40$ nm and $700\pm40$ nm within the wavelength region of the red light.

In another preferred embodiment of each aspect, said discriminant function is a linear discriminant function.

In still another preferred embodiment of each aspect, said discriminant function is of the second order.

According to its third aspect, the present invention provides an image forming apparatus which applies light beams to the image of a color original, with the reflected light being used to form a color image on a light-sensitive material by imagewise exposure, which image is then rendered visible as a reproduced color image. In this apparatus, information is read from the image of the color original to obtain a color density distribution of the original image for the light of each of three primary colors, and a low-density, low-contrast original is identified by means of discriminant formulas containing three parameters obtained from said color density distributions, i.e., image area density, background density and the proportion of the background area, with a predetermined density correction being performed for the so identified low-density, low-contrast original.

In a preferred embodiment of each of the first, second and third aspects, said three primary colors are red, green and blue.

BRIEF DESCRIPTION OF THE DRAWINGS

FIG. 11 is a schematic cross section of the essential part of an image forming apparatus according to the third aspect of the present invention;

FIG. 12 is a front view of the sensor assembly used in the image forming apparatus shown in FIG. 11;

DETAILED DESCRIPTION OF THE INVENTION

Figure 1:
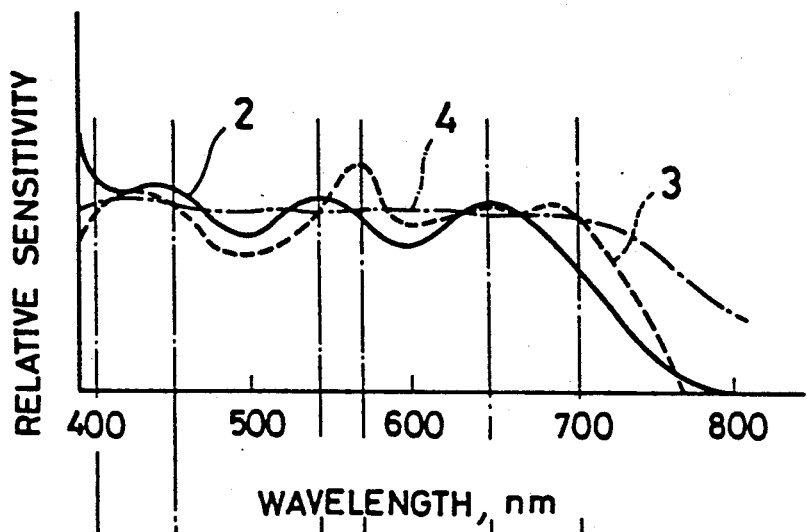
FIG. 1 is a graph showing the spectral reflection density distributions of a color photographic image, a color printed image and a black-and-white image.

The image forming apparatus of the present invention is described below in greater detail with reference to the preferred embodiments shown in the accompanying drawings.

The description starts with the first aspect of the present invention shown in FIGS. 1-6. According to this first aspect, at least two types of originals can be distinguished from each other by the following method. The reflected light from an original in the image forming apparatus of the present invention is measured with at least two sensors for the light of each of three primary colors, for example, red (hereinafter abbreviated as R), green (G) and blue (B), or for the light of at least one primary color, the sensors have sensitivity peaks at different wavelengths within the wavelength regions of the light of three primary colors or within the wavelength region of said at least one primary color. The type of the original is identified by distinguishing at least color photographic originals from another type of originals such as color printed originals or black-and-white originals using as the criterion the value of a discriminant function that uses said plural, say, six, values of measurements as parameters.

As mentioned above, the image forming apparatus of the present invention uses the value of a discriminant function, preferably a linear discriminant function, as the criterion for determining whether the original from which a black-and-white or color image is to be formed is a color photograph or color printed matter or a black-and-white original.

A linear discriminant function may be defined as follows: When a plurality of samples within each of groups A and B have "p" characteristic values x, a composite variable Z is constructed by the linear combination $Z = a_1 x_1 + a_2 x_2 \ldots + a_i x_i \ldots + a_p x_p$ (i=1, 2, ..., p)

which is used as the discrimination rule, and according to the magnitude of this composite variable Z, decision is made as to whether a sample of interest belongs to group A or B. Coefficients $a_1, a_2, \ldots,$ and $a_p$ are determined so as to insure reliable identification of group A or B from a given set of data, namely, to insure that $S_B/S_W$, the ratio of $S_B$ which is the variation between groups A and B (inter-class variation) to $S_W$ which is the variation in each group (intraclass variation), will assume the highest value.

While the discriminant function $Z=f(x_1, \ldots, x_n)$ used in the present invention is preferably a linear one as described above, precise separation may sometimes be accomplished by using a second-order discriminant function if the degree of scattering of values in each group to be discriminated differs greatly from group to group. Here, the second-order discriminant function is generally given by the following equation:

$$\begin{aligned}
Z &= f(x_1, x_2, \ldots, x_n) \\
&= a_{11} x_1^2 + a_{12} x_1 x_2 + \ldots + a_{1n} x_1 x_n \\
&+ a_{21} x_2 x_1 + a_{22} x_2^2 + \ldots + a_{2n} x_2 x_n \\
&\quad \vdots \\
&+ a_{n1} x_n x_1 + a_{n2} x_n x_2 + \ldots + a_{nn} x_n^2 \\
&+ a_1 x_1 + a_2 x_2 + \ldots + a_n x_n \\
&+ a
\end{aligned}$$

In addition to the linear discriminant function and second-order discriminant function described above, discriminant functions of the third order and higher, as well as other special discriminant functions may be used as the discriminant function $Z=f(x_1, \ldots, x_n)$ in the present invention. However, discriminant functions of lower orders, especially a linear discriminant function, are preferred since the higher the order, the greater the number of terms that are involved in mathematical operations and also special discriminant functions require complicated procedures in mathematical operations.

We now describe the image forming apparatus of the present invention with particular reference to the following case: the reflected light from an original is measured with two sensors for the light of each of three primary colors which have sensitivity peaks at different wavelengths within the wavelength ranges of the light of the three primary colors; a discriminant function, in particular a linear discriminant function, is constructed that uses the resultant six values of measurements as parameters; the type of the original is identified by distinguishing at least color photographic originals from color printed originals or black-and-white originals using the value of said discriminant function as the criterion.

FIG. 1 shows the spectral reflection density distributions of a color photographic image, a color printed image and a black-and-white image which have typical color distributions. The spectral reflection density distribution of a color photographic image is represented by the solid line 2, that of a color printed image by the dashed line 3, and that of a black-and-white image by the one-long-and-one-short dashed line 4.

As is clear from FIG. 1, the color photographic image has higher densities than the other images at wavelengths in the neighborhood of 400 and 450 nm. The magenta dye used in the color photographic image has a maximum density (maximum absorption wavelength) in the neighborhood of 530–560 nm whereas the cyan dye has a maximum density at about 630 nm. The cyan and magenta dyes have lower densities on either side of their respective maximum absorption wavelengths. The magenta ink used in the color printed image has a maximum density at about 570 nm whereas the cyan ink has a substantially constant density level in the neighborhood of 600–680 nm. At wavelengths longer than 700 nm, the color printed image decreases in density more sharply than the color photographic image and the black-and-white image. In contrast, the black-and-white, whether it is a photographic image or a printed image, has a substantially constant density level in each of the yellow (400–450 nm), magenta (530–580 nm) and cyan (600–700 nm) ranges.

Figure 2:
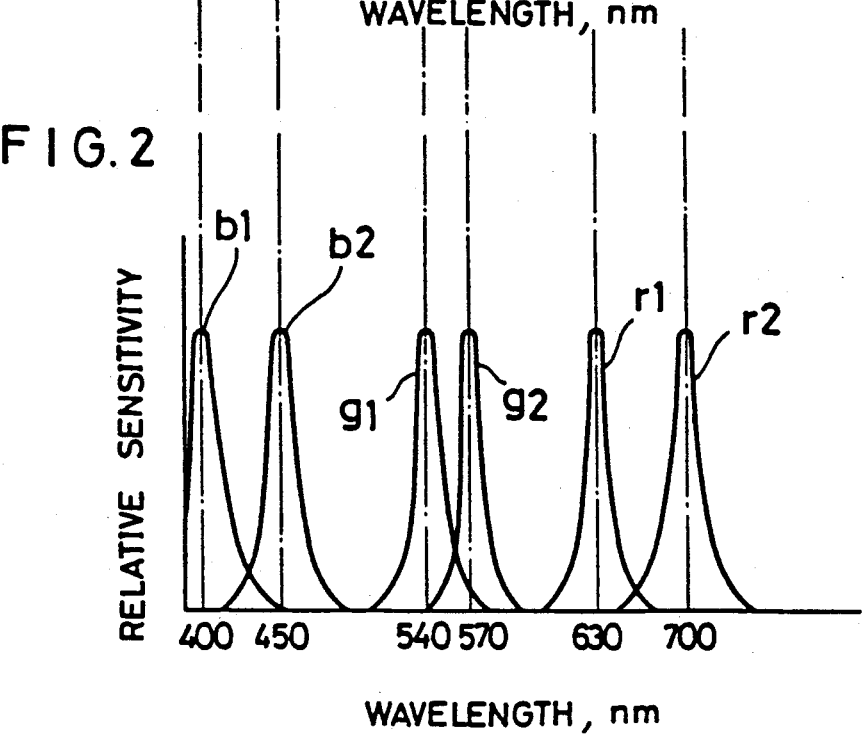
FIG. 2 is a graph showing the sensitivity characteristics of sensors that are applicable to the image forming apparatus of the present invention.

Thus, the color photographic image, color printed image and black-and-white image have different density distributions in each of the wavelength ranges of the light of three primary colors. Stated more accurately, there is some similarity between the density distributions of the color printed image and black-and-white image and these images can be clearly distinguished from the color photographic image in the wavelength ranges of the light of three primary colors. It is therefore concluded that the type of an original of interest from which an image is to be formed can be identified in an easy and precise manner by the following method: a number of color photographic originals, color printed originals and black-and-white originals are illuminated under a certain light source and the resulting reflected light is subjected to photometric measurements of reflection or absorption density with six sensors having sensitivity peaks around those wavelengths in the respective wavelength ranges of the light of three primary colors where maximum densities characteristic of both color printed originals and color photographic originals occur (illustrative sensitivity characteristics of these sensors are shown in FIG. 2); on the basis of the measured data, a linear discriminant function for identifying the types of originals which uses the values of measurements as parameters is constructed according to the already described discrimination rule (i.e., a linear discriminant function for determining the value of composite variable Z), and the value of this function is used as the criterion for identifying the type of originals.

Figure 3:
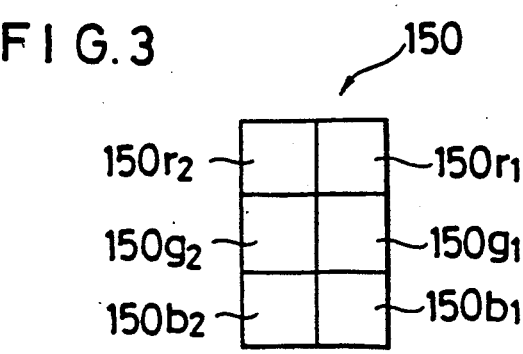
FIG. 3 is a schematic sketch of a typical image sensor assembly that may be used in the practice of the present invention.

Based on this conclusion, the present inventor fabricated an image sensor assembly of the type shown in FIG. 3 and generally indicated by 150. This sensor composed of a total of six sensors having the sensitivity characteristics shown in FIG. 1 and these six sensors were:

sensors $150b_1$ and $150b_2$ having sensitivity peaks 400 ±30 nm and 450±30 nm within the wavelength range of the blue (B) light;

sensors $150g_1$ and $150g_2$ having sensitivity peaks at 540 ±15 nm and 570±15 nm within the wavelength range of the green (G) light; and sensors $150r_1$ and $150r_2$ having sensitivity peaks at 630 ±40 nm and 700±40 nm within the wavelength range of the red (R) light.

Using this image sensor 150, the present inventor measured reflection density for about 300 samples each of color photographic originals and color printed originals of size A4. With r1, g1 and b2 (the output values of sensors $150r_1$, $150g_1$ and $150b_2$, respectively) as well as r1−r2 (the difference between the outputs of sensors $150r_2$ and $150r_1$), g2−g1 (the difference between the outputs of sensors $150g_2$ and $150g_1$) and b2−b1 (the difference between the outputs of sensors $150b_2$ and $150b_1$) being taken as parameters, the linear discriminant function shown below (Discriminant Function 1) was constructed in accordance with the discrimination rule already described above.

In the experiment, a halogen lamp with ratings of 80 V and 150 W was used as a light source. In the measurements with the sensors, the reflected light from each original was shaped to a slit of the size 10 mm × 100 mm and the average of 70 values of reflection density measured at intervals of 3 mm along the 210-mm side of A4 size sheet was taken.

DISCRIMINANT FUNCTION 1

$$Z = a_1 + a_2 \cdot r1 + a_3 \cdot g1 + a_4 \cdot b2 + a_5 \cdot R + a_6 \cdot G + a_7 \cdot B$$

If $Z<0$ in this Discriminant Function 1, the color original of interest is judged to be printed matter and if $Z \geq 0$, it is judged as a photograph.

Coefficients $a_1$–$a_7$ were so determined that the ratio of $S_B$ to $S_W$ for the printed and photographic originals would assume the greatest value and they were:

$a_1 = -14.33$
$a_2 = -0.11$
$a_3 = -0.37$
$a_4 = 0.45$
$a_5 = 1.19$
$a_6 = -0.67$
$a_7 = -0.96$

Symbols R, G and B in Discriminant Function 1 denote r1−r2, g2−g1 and b2−b1, respectively.

The present inventor conducted another experiment on 30 samples each of color printed and photographic originals and 16 samples of black-and-white originals using the image sensor assembly 150 and the light source which were the same as those employed in constructing Discriminant Function 1. Reflection densities were measured at the specified wavelengths under the same conditions as described above and based on the data of these measurements, Z was calculated by Discriminant Function 1 to classify the originals according to their type. The results are shown in Table 1 below, in which sample Nos. 1-30 were color printed originals, sample Nos. 31-60 were color photographic originals, and sample Nos. 61-76 were black-and-white originals, of which Nos. 61-63 were photographs and Nos. 64-76 were printed matter.

TABLE 1-1

| sample No. | r1 | g1 | b2 | R | G | B | Z |
|---|---|---|---|---|---|---|---|
| 1 | 36 | 44 | 48 | 3 | 7 | 2 | −16.01 |
| 2 | 48 | 47 | 55 | 3 | 10 | −2 | −13.46 |
| 3 | 49 | 75 | 78 | 2 | 0 | 10 | −19.59 |
| 4 | 75 | 101 | 118 | 4 | 7 | 16 | −22.14 |
| 5 | 40 | 45 | 52 | 3 | 6 | 3 | −15.31 |
| 6 | 54 | 56 | 65 | 4 | 5 | 2 | −12.25 |
| 7 | 51 | 53 | 50 | 3 | 9 | −5 | −14.71 |
| 8 | 84 | 73 | 115 | 4 | 20 | 18 | −24.75 |
| 9 | 74 | 81 | 106 | 3 | 12 | 13 | −21.69 |
| 10 | 32 | 43 | 46 | 2 | 5 | 0 | −14.03 |
| 11 | 50 | 113 | 113 | 4 | −7 | 22 | −22.46 |
| 12 | 50 | 61 | 52 | 3 | 9 | −5 | −17.54 |
| 13 | 69 | 72 | 73 | 4 | 17 | 0 | −22.34 |
| 14 | 50 | 38 | 25 | 4 | 14 | −17 | −10.94 |
| 15 | 32 | 88 | 91 | 4 | −7 | 21 | −20.19 |
| 16 | 41 | 46 | 46 | 4 | 5 | −1 | −12.79 |
| 17 | 100 | 98 | 50 | 6 | 15 | −28 | −15.12 |
| 18 | 87 | 114 | 118 | 5 | −1 | 13 | −18.84 |
| 19 | 49 | 67 | 71 | 2 | 3 | 0 | −12.19 |
| 20 | 66 | 61 | 39 | 3 | 14 | −13 | −19.94 |
| 21 | 49 | 49 | 52 | 2 | 8 | −1 | −16.10 |
| 22 | 30 | 53 | 59 | 3 | 1 | 7 | −14.51 |
| 23 | 12 | 20 | 24 | 3 | 0 | 0 | −11.64 |
| 24 | 49 | 52 | 49 | 3 | 3 | −6 | −9.59 |
| 25 | 25 | 48 | 52 | 2 | 2 | 8 | −18.08 |
| 26 | 21 | 25 | 35 | 2 | 3 | 1 | −10.73 |
| 27 | 35 | 44 | 65 | 3 | 4 | 9 | −12.96 |
| 28 | 21 | 26 | 38 | 2 | −1 | 5 | −10.91 |
| 29 | 26 | 36 | 33 | 3 | 4 | −2 | −12.85 |
| 30 | 27 | 28 | 34 | 3 | 6 | −1 | −11.85 |

TABLE 1-2

| sample No. | r1 | g1 | b2 | R | G | B | Z |
|---|---|---|---|---|---|---|---|
| 31 | 54 | 58 | 60 | 10 | −4 | −14 | 13.29 |
| 32 | 25 | 31 | 26 | 9 | −3 | −20 | 15.07 |
| 33 | 39 | 47 | 43 | 11 | −5 | −14 | 13.22 |
| 34 | 57 | 55 | 53 | 11 | −1 | −26 | 21.62 |
| 35 | 63 | 64 | 60 | 16 | −3 | −17 | 19.43 |
| 36 | 48 | 52 | 48 | 11 | −4 | −23 | 20.60 |
| 37 | 53 | 51 | 49 | 13 | −1 | −27 | 25.08 |
| 38 | 66 | 66 | 59 | 13 | −3 | −28 | 24.90 |
| 39 | 49 | 48 | 47 | 11 | −2 | −27 | 24.02 |
| 40 | 69 | 77 | 68 | 17 | −7 | −22 | 26.23 |
| 41 | 66 | 86 | 82 | 16 | −16 | −7 | 19.97 |
| 42 | 26 | 27 | 26 | 6 | 0 | −13 | 4.14 |
| 43 | 68 | 71 | 66 | 16 | −4 | −23 | 25.42 |
| 44 | 67 | 61 | 49 | 18 | 0 | −29 | 27.04 |
| 45 | 74 | 88 | 101 | 19 | −11 | 6 | 14.64 |
| 46 | 24 | 25 | 23 | 6 | −1 | −17 | 8.26 |
| 47 | 31 | 32 | 33 | 7 | −1 | −14 | 7.71 |
| 48 | 68 | 92 | 99 | 15 | −15 | 3 | 13.72 |
| 49 | 48 | 43 | 41 | 20 | 1 | −16 | 21.42 |
| 50 | 41 | 44 | 41 | 11 | −3 | −24 | 22.91 |
| 51 | 124 | 107 | 109 | 24 | −2 | −12 | 22.91 |
| 52 | 26 | 24 | 23 | 7 | 1 | −21 | 12.10 |
| 53 | 39 | 39 | 45 | 8 | −3 | −6 | 4.49 |
| 54 | 66 | 77 | 76 | 17 | −11 | −11 | 22.28 |
| 55 | 24 | 23 | 23 | 6 | 0 | −19 | 10.25 |
| 56 | 23 | 23 | 22 | 5 | 0 | −19 | 8.72 |
| 57 | 53 | 51 | 55 | 26 | 1 | 1 | 15.03 |
| 58 | 29 | 33 | 33 | 6 | −1 | −10 | 2.53 |
| 59 | 30 | 32 | 33 | 6 | −1 | −10 | 1.83 |
| 60 | 54 | 69 | 72 | 12 | −9 | −6 | 12.67 |

TABLE 1-3

| sample No. | r1 | g1 | b2 | R | G | B | Z |
|---|---|---|---|---|---|---|---|
| 61 | 77 | 81 | 81 | −1 | −2 | −4 | −12.33 |
| 62 | 29 | 30 | 28 | 0 | 1 | −9 | −8.05 |
| 63 | 63 | 64 | 64 | 1 | 0 | −4 | −11.11 |
| 64 | 42 | 42 | 41 | 1 | 0 | −3 | −11.97 |
| 65 | 49 | 49 | 47 | 1 | 0 | −3 | −12.63 |
| 66 | 33 | 34 | 33 | 1 | 0 | −3 | −11.62 |
| 67 | 31 | 32 | 37 | 4 | 1 | 0 | −8.84 |
| 68 | 11 | 14 | 15 | 2 | −2 | 2 | −12.17 |
| 69 | 31 | 29 | 32 | 3 | 2 | 1 | −12.80 |
| 70 | 66 | 67 | 69 | 7 | 0 | 2 | −8.92 |
| 71 | 8 | 8 | 11 | 2 | 1 | 1 | −12.47 |
| 72 | 13 | 12 | 16 | 3 | 1 | −2 | −8.18 |
| 73 | 6 | 6 | 8 | 2 | 2 | −3 | −9.69 |
| 74 | 10 | 10 | 13 | 4 | 1 | 0 | −9.19 |
| 75 | 46 | 48 | 53 | 5 | 0 | 0 | −7.35 |
| 76 | 85 | 86 | 88 | 6 | 2 | 2 | −12.02 |

If $Z < 0$ in Discriminant Function 1, the original of interest is judged to be either a color printed original or a black-and-white original and if $Z \geq 0$, it is judged as a color photographic original.

Thus, the data in Table 1 shows the following: if the light of each of three primary colors is measured with two sensors having sensitivity peaks at different wavelengths within the associated wavelength range and if the resulting six values of measurements are used as parameters, color photographic originals can be effectively differentiated from color printed originals or black-and-white originals by a single discriminant function unlike in the case of the prior art methods which require at least two discriminant functions to be used in combination.

The values that can be used as parameters in the discriminant function for effective operation of the image forming apparatus of the present invention are by no means limited to those described above (r1, g1, b2, r1−r2, g2−g1, and b2−b1) and various other values may be employed, such as the six output values of the sensors and the sum, rather than the difference, of the values of measurements within the wavelength range of the light of each of three primary colors. However, in order to insure that color photographic originals are precisely differentiated from black-and-white originals or color printed originals by a simple discriminant function, at least one value of measurement within the wavelength range of the light of each of three primary colors and the difference between the values of measurements within said wavelength are preferably used as parameters as in the case of Discriminant Function 1.

Figure 4:
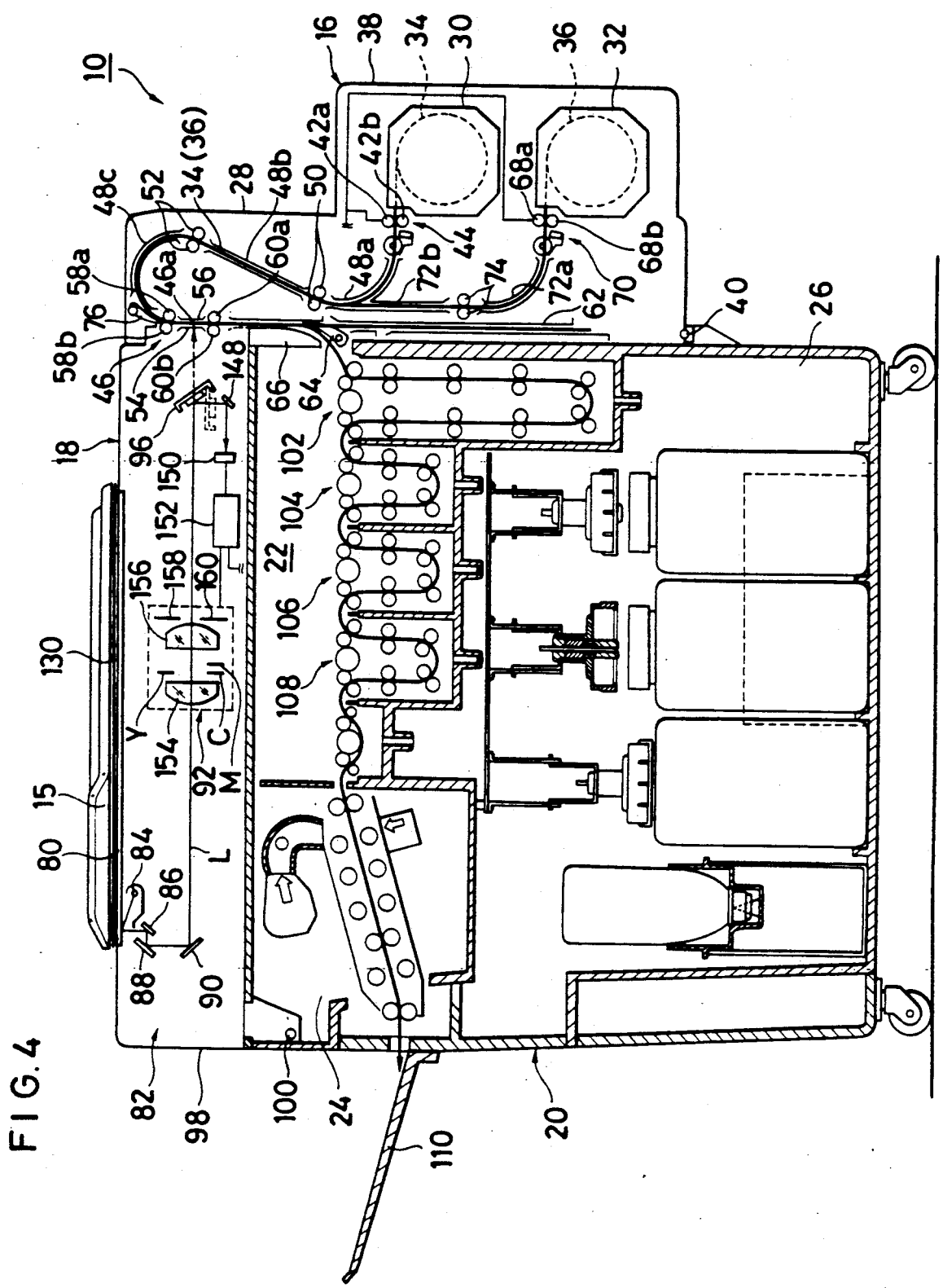
FIG. 4 is a diagrammatic representation of a silver halide photographic copier in which the image forming apparatus of the present invention is used.

FIG. 4 is a diagrammatic representation of a silver halide photographic copier in which the image forming apparatus of the present invention is used. The silver halide photographic copier generally indicated by 10 in FIG. 4 (which is hereinafter referred to simply as copier 10) comprises three basic units 16, 18 and 20. The unit 16 is on the right side and light-sensitive materials are supplied therefrom; the unit 18 in the upper part of the copier 10 is an exposing unit, and the unit 20 in the lower part is a processing unit.

The exposing unit 18 has disposed therein an image sensor assembly 150 of the same type as shown in FIG. 3 and used in constructing Discriminant Function 1 and an original identifying section 152 which, on the basis of the values of measurements with the image sensor assembly 150, determines whether the original of interest is a color photograph, color printed matter or a black-and-white original by Discriminant Function 1 and which then supplies the resulting discrimination signal to a lens unit 92, or, if the copier has a capability of automatically selecting light-sensitive materials, to the system of controlling transport rollers in the light-sensitive material supply unit 16.

In the copier 10 of the present invention, the image sensor assembly 150 in combination with the original identifying section 152 distinguishes at least color photographic originals from color printed originals or black-and-white originals by Discriminant Function 1 and, according to the result of this identification, the lens unit 92 performs predetermined adjustments of the quantity of light and color density that are appropriate for the identified type of original, or the unit 16 supplies the appropriate light-sensitive material.

The unit 16 has a passageway for the transport of light-sensitive materials in a frame 28, with two magazines 30 and 32 being detachably disposed one on the other. Rolls of light-sensitive materials 34 and 36 are accommodated within the respective magazines and may be unwound to have their leading edge emerge to the passageway of the unit 16. To take an example, the light-sensitive material 34 may be a contrasty one which is optimal for copying reflection type color printed originals, and the light-sensitive material 36 may be a soft one which is optimal for copying color photographic originals.

Transport rollers 42a and 42b for withdrawing the light-sensitive material 34 are disposed ahead of the magazine 30 and further ahead is a cutter 44 for cutting the light-sensitive material 34 to a predetermined length. Transport rollers 42a and 42b receive a signal from the original identifying section 152 and, in response to that signal, withdraw the light-sensitive material 34 from the magazine 30.

Transport guides 48a, 48b and 48c as well as transport rollers 50 and 52 are disposed between the cutter 44 and an exposure section 46 so that the a predetermined length of light-sensitive material 34 is guided to the exposure section 46.

The exposure section 46 is where the exposing position 46a (exposure plane) of the light-sensitive material 34 is defined and it comprises a glass plate 54 fixed to face the imaging optical system of the exposing unit 18 and a plate 56 pressed against this glass plate 54.

A pair of transport rollers 58a and 58b and another pair of transport rollers 60a and 60b are disposed upstream (in the upper part)and downstream (in the lower part), respectively, of the exposure section 46.

Below the exposure section 46 is situated a transport guide 62 for guiding the exposed light-sensitive material 34 downwardly in a vertical direction. Halfway down the transport guide 62 is provided a switching guide 64 which changes the transport of the light-sensitive material 34 (of 36) to be directed to the processing unit 20 via a branching transport guide 66.

The magazine 32 located below the magazine 30 is equipped with a similar mechanism to the one described above.

Transport rollers 68a and 68b and cutter 70 are provided in association with the light-sensitive material 36. Ahead of the cutter 70 are provided transport guides 72a and 72b as well as a transport roller 74 for transporting the light-sensitive material 36 to a transport guide 48a. Like transport rollers 42a and 42b, the transport rollers 68a and 68b are so designed that they receive a signal from the original identifying section 152 and withdraw the light-sensitive material 36 in response to the received signal.

The exposing unit 18 is the most characteristic element of the copier 10 and comprises the following components: a platen 80 typically made of a transparent glass plate on which a reflection type original 130 is to be placed; a top cover 15 for holding the original in proper position on the platen 80; an imaging optical system 82 with a movable light source that applies the image on the platen 80 onto the light-sensitive material 34 (or 36) in the exposure section 46 by slit scanning and exposure; the image sensor assembly 150 for measuring the reflection density of the reflected light from the original 130 (hereinafter referred to simply as the reflected light) during prescanning; the original identifying section 152 which, on the basis of the values of measurements with the image sensor assembly 150, determines whether the original 130 is a color photograph, color printed matter or a black-and-white original by Discriminant Function 1 and which then supplies the resulting discrimination signal to the lens unit 92 or, if the copier has a capability of automatically selecting light-sensitive materials as shown in FIG. 4, to the transport rollers in the light-sensitive material supply unit 16; and a shutter 96 which acts on the optical path L of the reflected light to connect it to either the exposure section 46 or the image sensor 150. The imaging optical system 82 is composed of a light source unit having a light source 84 for scanning the underside of the platen 80 and a reflecting mirror 86, mirrors 88 and 90 which move in the same direction as the light source unit at a speed one half the scanning speed so as to allow the light from the light source 84 to be reflected in a given direction, and the lens unit 92.

The lens unit 92 has a front lens group 154 and a rear lens group 156 for allowing the reflected light from the original 130 to focus on the exposing position 46a, a cyan filter C, a yellow filter Y and a magenta filter M used to perform color correction on the reflected light and which correspond to cyan, yellow and magenta colors, respectively, and plates 158 and 160 making up a movable aperture stop for correcting the quantity of the reflected light.

In the copier 10 of the present invention, the lens unit 92 is connected to the original identifying section 152 and, in response to a discrimination signal from the original identifying section 152, it adjusts the quantity and color density of the reflected light by predetermined amounts according to the identified type of the original 130.

If the user selects the contrasty light-sensitive material 34 and if the original 130 is identified either as color print or as a black-and-white original, copying is effected under standard conditions that have been set for the reproduction of contrasty image. However, if the original 130 is identified as a color photograph, the yellow filter Y is removed and the quantity of light is increased. If the user selects the soft light-sensitive material 36 and if the original 130 is identified as a color photograph, copying is effected under standard conditions that have been set for the reproduction of soft image. However, if the original 130 is identified either as color print or as a black-and-white original, the cyan filter C is inserted. The imaging optical system 82 in the copier 10 is so designed that the lens unit 92 moves along the optical path L for adjusting its length, thereby enabling zooming up to a magnification of 0.5-2.0.

The shutter 96 serves to change the optical path L of the reflected light in prescanning and exposing modes. In the prescanning mode, the shutter 96 is closed as indicated by the solid line in FIG. 4 and the optical path L of the reflected light is connected to the image sensor assembly 150. In the exposing mode, the shutter 96 is opened as indicated by the dashed line and the reflected light is allowed to expose the light-sensitive material 34 (or 36).

The image sensor assembly 150 which is used to measure the density of the reflected light from the original 130 is of the same type as used in constructing Discriminant Function 1 and comprises the following six sensors having the sensitivity characteristics shown in FIG. 2:

sensors $150b_1$ and $150b_2$ having sensitivity peaks at 400 nm and 450 nm within the wavelength range of the blue (B) light;

sensors $150g_1$ and $150g_2$ having sensitivity peaks at 540 nm and 570 nm within the wavelength range of the green (G) light; and sensors $150r_1$ and $150r_2$ having sensitivity peaks at 630 nm and 700 nm within the wavelength range of the red (R) light.

The image sensor assembly 150 also contains a condenser lens such as a Fresnel lens for condensing the reflected light. The values of measurements from the image sensor assembly 150 are sent to the original identifying section 152.

The original identifying section 152 determines whether the original 130 is a color photograph, printed matter or a black-and-white original by Discriminant Function 1 on the basis of the values of measurements from the image sensor assembly 150, and sends the resulting discrimination signal to the lens unit 92 or, if the copier 10 has a capability of automatically selecting light-sensitive materials as shown in FIG. 4, to the light-sensitive material supply unit 16.

Figure 5:
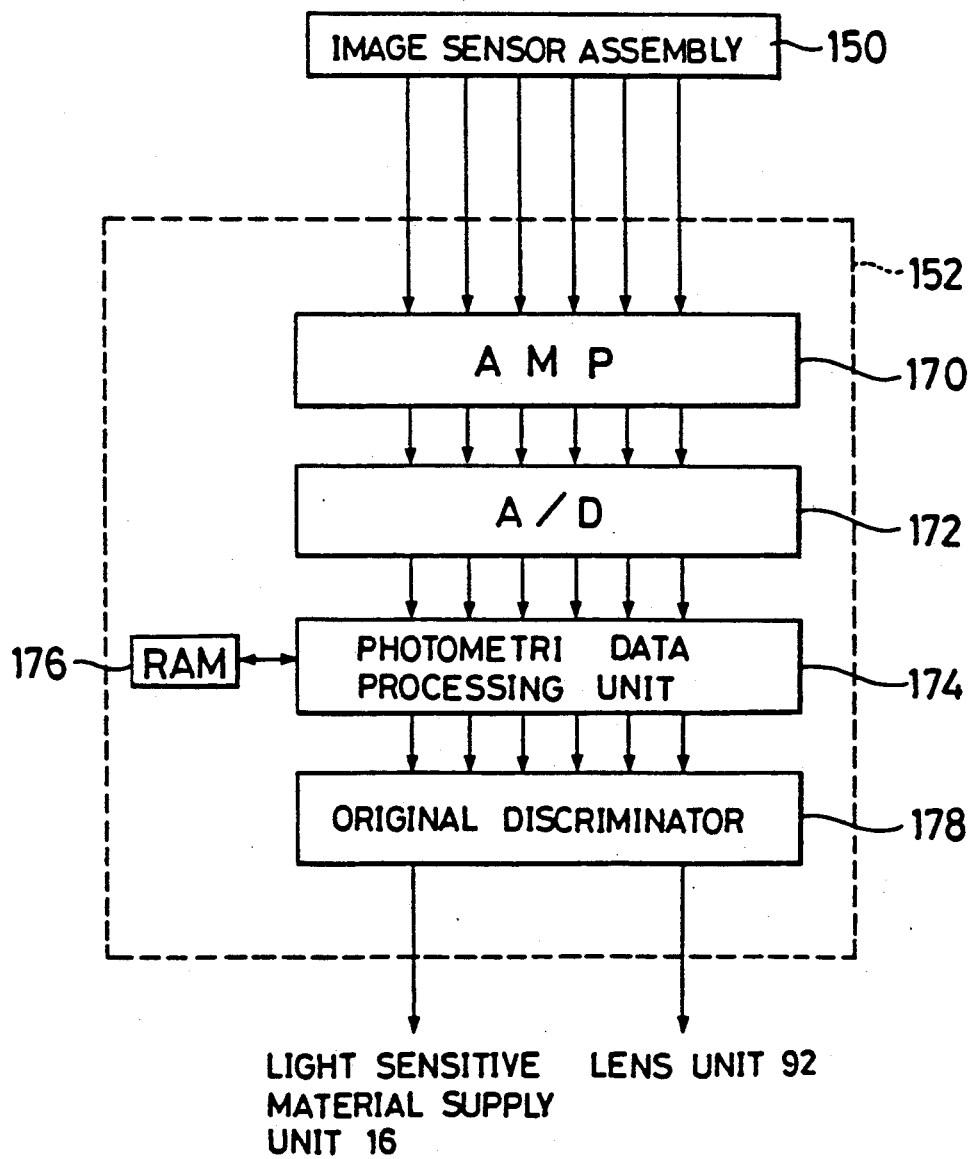
FIG. 5 is a block diagram showing one construction of the document (or original) identifying unit of the silver halide photographic copier shown in FIG. 4.

The construction of the original identifying section 152 is shown schematically by a block diagram in FIG. 5. Each of the values of measurements by the image sensor assembly 150 are sent as an output signal to an amplifier 170 and the amplified signal is sent to an A/D converter 172 for conversion to a density signal. Two density signals obtained for each of three primary colors are sent to a photometric data processing unit 174 and then to RAM 176.

Subsequently, the resulting discrimination signal is sent to the lens unit 92 or, if the copier has a capability of automatically selecting light-sensitive materials as shown in FIG. 4, to the light-sensitive material supply unit 16. The lens unit 92 is set at predetermined conditions for adjusting the reflected light according to the identified type of the original, or instead a light-sensitive material appropriate for the identified type of the original is supplied from the unit 16.

The processing unit 20 is basically composed of a processing zone 22 and a drying zone 24. The processing zone 22 contains in it a sequence of a developing tank 102, a bleach-fixing tank 104 and washing tanks 106 and 108 and the light-sensitive material 34 (or 36), after being developed, bleached, fixed and rinsed with the processing solutions in these tanks, in sent to the drying zone 24. The drying zone 24 is so constructed that the rinsed light-sensitive material 34 (or 36) is dried and sent to a receiving tray 110.

In the copier 10, the image sensor assembly 150 is used for identifying the type of an original of interest but the present invention is by no means limited to this particular case alone and as will be described hereinafter, one way of course adopts a modification in which various kinds of image information are obtained with the image sensor assembly 150 and the reflected light is subjected to appropriate corrections in the lens unit 92 in accordance with the obtained image formation.

Having the basic construction described above, the image forming apparatus of the present invention has the ability to distinguish color photographic originals at least from color printed originals by using a discriminant function. Black-and-white originals, whether they are printed matter or photographs, are identified as color printed originals. An appropriate light-sensitive material is selected according to the identified type of the original and an image is formed on the selected light-sensitive material.

The use of a discriminant function is not the sole method for identifying various types of originals with black-and-white originals being judged as color printed originals. A known method such as the one described in Japanese Kokai 63-232681 can also be employed. In this known method, an original of interest is judged to be a black-and-white original if it has substantially equal spectral reflection densities for the light of three primary colors, R, G and B, and it is judged as a color original if the spectral reflection densities measured for the light of the three primary colors differ so greatly that they do not agree to one another.

The originals that have been identified as black-and-white originals by the methods described above are processed in entirely the same manner as in the case of operating the copier shown in FIG. 4. For example, if the user selects a contrasty light-sensitive material, it is exposed under standard exposure conditions for contrasty materials and processed to form an image. The associated units and their operations are the same as those already described and need not be explained in detail. Needless to say, standard conditions set for the processing of soft light-sensitive materials shall be combined with a cyan (C) filter if the user selects a soft material to form image from a black-and-white original. It should of course be noted that color photographic originals are distinguished from color printed originals by the methods already described or by some other suitable methods.

Figure 6:
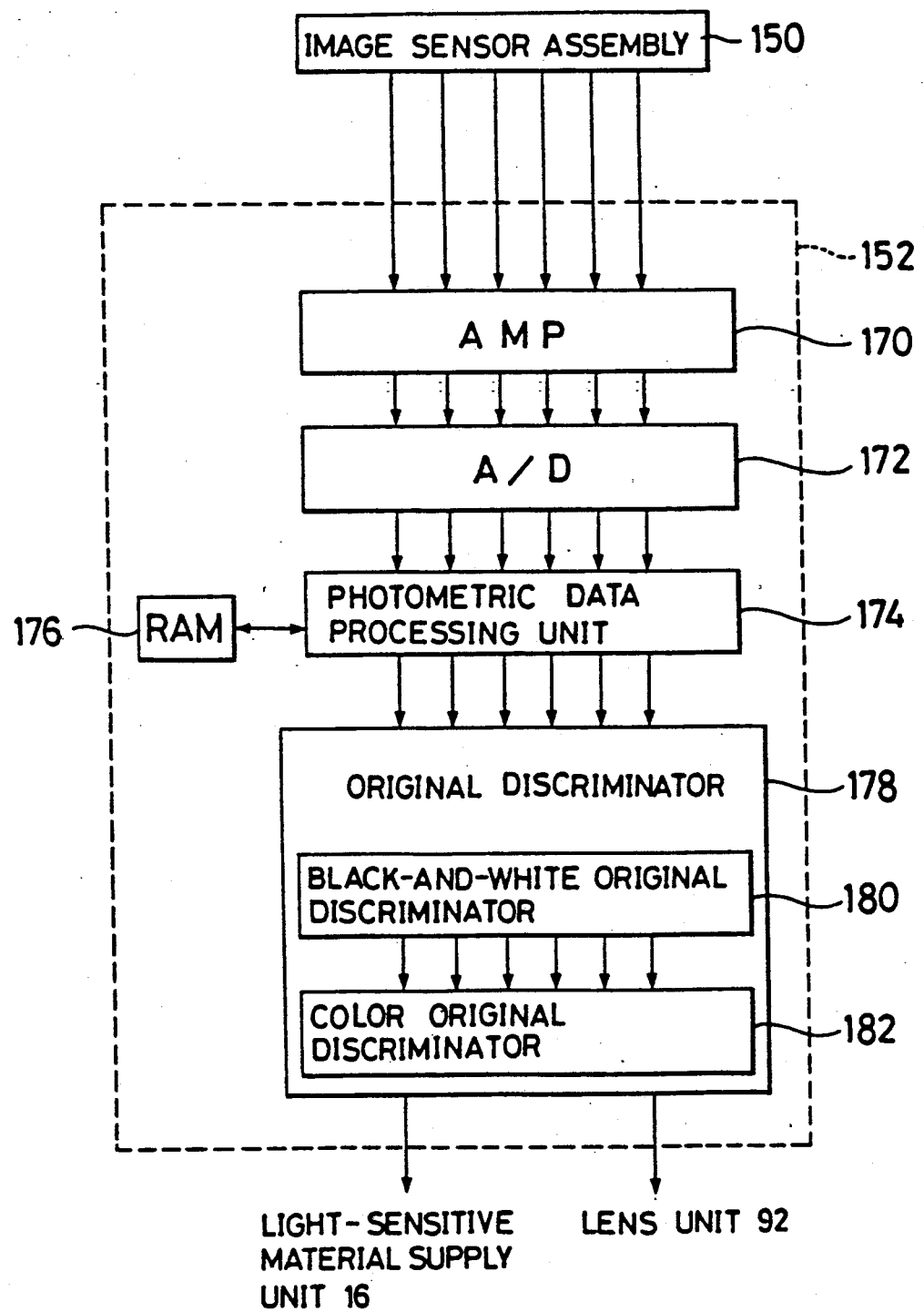
FIG. 6 is a block diagram showing another construction of the document (or original) identifying unit of the silver halide photographic copier shown in FIG. 4.

An example of other methods for differentiating color printed originals from color photographic originals is to use a two-stage discriminator adapted from the original discriminator 178 in the original identifying section 152 shown in FIG. 5 and which consists of, as shown in FIG. 6, a black-and-white original identifying unit 180 which discriminates black-and-white originals from color originals and a color original identifying unit 182 which discriminates color printed originals at least from color photographic originals.

The image forming apparatus of the present invention shown in FIG. 4 is applicable to at least four kinds of silver halide photographic materials, i.e., contrasty light-sensitive materials for black-and-white and color printing, soft light-sensitive materials for color photography and color slides, light-sensitive materials for color negative, and light-sensitive materials for OHPs (overhead projectors).

Originals of the types appropriate to these light-sensitive materials and standard exposure conditions therefor can be set by the method described hereinafter.

The method of performing exposure with the image exposing apparatus is intended to discriminate color photographic originals at least from color printed originals or black-and-white originals so as to enable image formation using a light-sensitive material that is appropriately determined to correspond to the identified type of the original of interest. According to this method, standard exposure conditions that are present for image formation that involves exposing the image of a certain type of standard original to a light-sensitive material appropriate for said standard original are used as reference set values, and if there is a difference in type between said standard original and the original to be used and/or a difference between said appropriate light-sensitive material and the light-sensitive material to be used, the set values of standard exposure conditions are corrected by adding, to said set reference values, those values which are predetermined for both the original and the light-sensitive material to be used with respect to the reference standard original and appropriate light-sensitive material, with subsequent imagewise exposure being performed on the basis of the thus corrected standard exposure conditions.

This method is described below more specifically. First, standard exposure conditions such as those relating to filters (Y, M and C filters) and D (density) adjustment are set to simulate the case where the image of a standard original which is of the most appropriate type of original is exposed to a commonly employed standard light-sensitive material. These standard exposure conditions are used as reference set values for the image exposing apparatus being considered. These reference values may be set by the user or operator who performs manual correction on the filters based on the results of copying tests. Alternatively, automatic setting may be performed by having the result of a test chart copying read with a suitable device such as the image exposing unit in a color copier.

The set reference values or standard exposure conditions and the combination of the standard original's type and light-sensitive material are used as a basis for setting new standard exposure conditions when the type of original and/or the light-sensitive material is changed. This is done by adding, to the reference set values, differences $\Delta Y$, $\Delta M$, $\Delta C$ and $\Delta D$ that have been preset according to the actually used type of original and/or light-sensitive material. On the basis of these new standard exposure conditions, the image exposing apparatus being considered exposes the image of the original of the new combination to the associated light-sensitive material, thereby reproducing a visible or latent image.

In the operation of the image exposing apparatus being considered, the combination of the standard original's type and light-sensitive material for obtaining the reference set values and the differences in standard exposure conditions ($\Delta Y$, $\Delta M$, $\Delta C$ and $\Delta D$) that occur when there is a change in the original's type and/or the light-sensitive material are preferably predetermined uniquely. This offers the following great advantage to the operation of an image forming apparatus or a color copier that uses the image exposing apparatus being considered: even if the reference set values for the standard original and light-sensitive material are reset periodically by performing actual measurements by the setting method described above, there is no need for actual measurements of the differences ($\Delta Y$, $\Delta M$, $\Delta C$ and $\Delta D$) that result from the variations in the settings of such reference values. The reference set values are subject to changes for several reasons such as the change that occurs in the image forming apparatus with time but the differences $\Delta Y$, $\Delta M$, $\Delta C$ and $\Delta D$ will not vary as greatly as these reference set values.

Therefore, even if the combination of a standard original's type and a standard light-sensitive material is not used, the image exposing apparatus being considered is always capable of reproducing an image having satisfactory density, gradation, color and color balance. This is possible without performing a copying test on every occurrence of a change in the type of original and light-sensitive material for the purpose of adjusting or resetting the standard exposure conditions.

Figure 7:
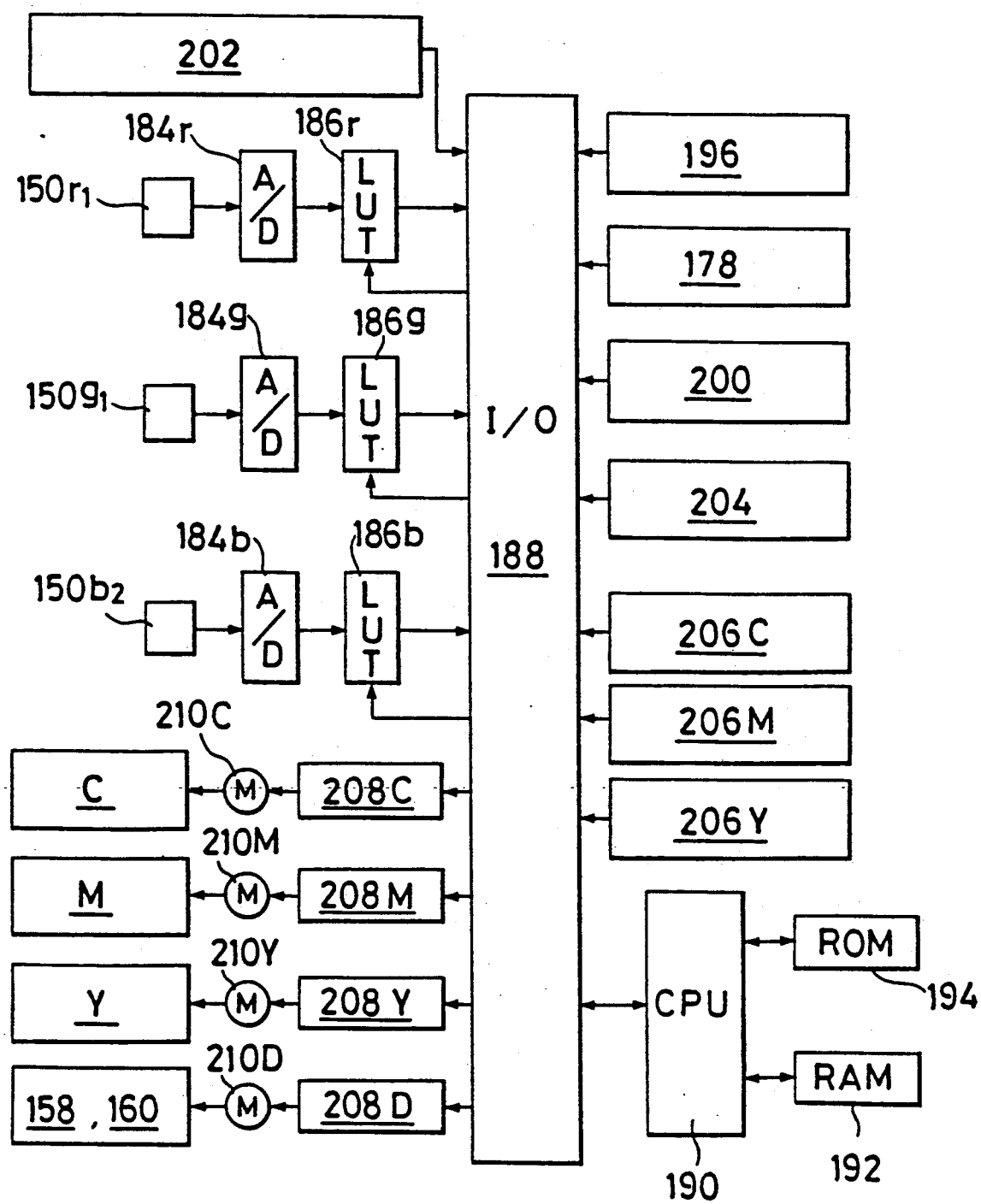
FIG. 7 is a block diagram showing one construction of the exposure control unit of an image forming apparatus of the present invention.

A block diagram of the exposure control system in an image forming apparatus that is used to set the standard exposure conditions described above and to perform color correction on the basis of the so set standard exposure conditions is shown in FIG. 7. In the image sensor assembly 150 shown in FIG. 3, two sensors are provided for each of red, green and blue colors but for exposure control, only one sensor needs to be used for each color. The following description of the example shown in FIG. 7 assumes that three sensors $150r_1$, $150g_1$ and $150b_2$ are used to measure red, green and blue colors, respectively.

Each of red color sensor $150r_1$, green color sensor $150g_1$ and blue color sensor $150b_2$ produces an electric signal in proportion to the quantity of incident light (exposure amount). The output signals may be amplified as required before they are sent to associated A/D converters 184r, 184g and 184b, where they are converted to digital signals. The resulting digital signals are subjected to signal conversion in lookup tables 186r, 186g and 186b which have data written in for correcting the sensitivity characteristics of sensors $150r_1$, $150g_1$ and $150b_2$, respectively. The lookup tables produce data for corrected amounts of exposure. The output signals from these lookup tables are taken into a RAM 192 via an I/O port 188 and a CPU 190.

The CPU 190 is operated in accordance with the program stored in a ROM 194 and performs sequence control on the respective parts of the system during the calculation and automatic setting of standard exposure conditions as appropriate for the original and light-sensitive material used, during the setting of reference values for standard exposure conditions, and during color copying (including prescanning). When installing the image forming or copying apparatus to be applied, standard exposure conditions for performing image reproduction or copying with the combination of a standard original and a standard light-sensitive material that is appropriate for this original are preferably stored as reference set values in the RAM 192.

It is also preferred that when installing the apparatus, the differences between said reference set values and the standard exposure conditions for the case where the original and/or light-sensitive material to be used has been changed from said standard original or light-sensitive material are stored in the RAM 192.

A mode designating key 194 is used to select a reference value setting mode or a copying mode. The original discriminator 178 identifies the type of an original of interest in the manner already described. A light-sensitive material input key 200 is used to select or manually enter the light-sensitive material to be used. A light-sensitive material reading unit 202 reads automatically the light-sensitive material used and may be a reader or bar code reader which reads the mark, code or bar code on the light-sensitive material when it is set in the copier or some other image forming apparatus. A copy key 204 is manipulated to start the reference value setting mode or copy mode. A cyan correction key 206, magenta correction key 206M and a yellow correction key 206Y are manipulated to perform desired color correction manually on the already set exposure conditions.

When setting reference values, standard exposure conditions or corrected exposure conditions or when correcting the standard exposure conditions manually, CPU 190 permits motors 210C, 210M and 210Y to be driven with drivers 208C, 208M and 208Y, respectively, so as to adjust the amount by which color filters Y, M and C are inserted into the optical path. A driver 208D drives a motor 210D to have the plates 158 and 160 of the movable aperture stop move close to or apart from each other.

An illustrative method for setting standard exposure conditions with the image forming apparatus of the present invention is described below with reference to the case where the light-sensitive materials to be used comprise soft light-sensitive materials which are appropriate for copying from color photographic originals, normal light-sensitive materials appropriate for color printed originals and OHP light-sensitive materials appropriate for OHPS, whereas the originals to be processed comprise color printed originals, color photographic originals, and intermediate originals containing both printed and photographic images.

As already mentioned, the original discriminator 178 in the image forming apparatus 10 identifies a color original of interest as a color photograph if the value of Z of Discriminant Function 1 is positive or zero ($Z \geq 0$), and as printed matter if Z is negative ($Z < 0$). If given threshold values $L_P$ and $L_I$ are calculated from a given number of samples, a certain original may be identified as being of an intermediate type if $L_I < Z < L_P$.

(1) With soft light-sensitive materials, standard exposure conditions are adjusted to provide satisfactory finish for standard photographic originals and such standard exposure conditions are preliminarily set as reference values in the RAM 192:

$Y = Y_S$
$M = M_S$
$C = C_S$

A preferred design is such that if a soft light-sensitive material is selected by manipulation of the light-sensitive material input key 200, CPU 190 automatically calls the reference set values from RAM 192 and sets the standard exposure conditions to said reference values (this operation is referred to as "auto setup").

The differences between the reference set values and the standard exposure conditions for copying a color printed original or an intermediate original onto the soft light-sensitive material (a set of $\Delta Y_I$, $\Delta M_I$, $\Delta C_I$ and $\Delta D_I$ or a set of $\Delta Y_{MS}$, $\Delta M_{MS}$, $\Delta C_{MS}$ and $\Delta D_{MS}$) are preliminarily stored in RAM 192. When either a color printed original or an intermediate original is selected by automatic identification with the original discriminator 178, CPU 190 automatically sets the standard exposure conditions as follows:

| for color printed original | for intermediate original |
| --- | --- |
| $Y = Y_S + \Delta Y_I$ | $Y = Y_S + \Delta Y_{MS}$ |
| $M = M_S + \Delta M_I$ | $M = M_S + \Delta M_{MS}$ |
| $C = C_S + \Delta C_I$ | $C = C_S + \Delta C_{MS}$ |
| $D = D_S + \Delta D_I$ | $D = D_S + \Delta D_{MS}$ |

The amount by which Y, M and C filters are inserted into the optical path and the distance between plates 158 and 160 of the movable aperture stop are automatically set to the values that satisfy these conditions.

(2) With normal light-sensitive materials, standard exposure conditions are adjusted to provide satisfactory finish for standard printed originals and such standard exposure conditions are preliminarily set as reference values in the RAM 192:

$Y = Y_N$
$M = M_N$
$C = C_N$
$D = D_N$

A preferred design is such that if a normal light-sensitive material is selected by manipulation of the light-sensitive material input key 200, CPU 190 automatically calls the reference set values from RAM 192 and sets the standard exposure conditions to said reference values ("auto setup" operation).

The differences between the reference set values and the standard exposure conditions for copying a color photographic original or an intermediate original onto the normal light-sensitive material (a set of $\Delta Y_P$, $\Delta M_P$, $\Delta C_P$ and $\Delta D_P$ or a set of $\Delta Y_{MN}$, $\Delta M_{MN}$, $\Delta C_{MN}$ and $\Delta D_{MN}$) are preliminarily stored in RAM 192. When either a color photographic original or an intermediate original is selected by automatic identification with the original discriminator unit 178, CPU 190 automatically sets the standard exposure conditions as follows:

| for color photographic original | for intermediate original |
| --- | --- |
| $Y = Y_N + \Delta Y_P$ | $Y = Y_N + \Delta Y_{MN}$ |
| $M = M_N + \Delta M_P$ | $M = M_N + \Delta M_{MN}$ |
| $C = C_N + \Delta C_P$ | $C = C_N + \Delta C_{MN}$ |
| $D = D_N + \Delta D_P$ | $D = D_N + \Delta D_{MN}$ |

(3) With OHP light-sensitive material, the standard exposure conditions that will provide satisfactory finish for standard OHP originals are set as reference values according to similar procedures ("auto setup" operation) to those employed in (1) and (2).

$Y = Y_{OH}$
$M = M_{OH}$
$C = C_{OH}$
$D = D_{OH}$

As in (1) and (2), the standard exposure conditions are automatically set according to the identified type of originals:

| for color photographic original | for color printed original |
| --- | --- |
| $Y = Y_{OH} + \Delta Y_{PO}$ | $Y = Y_{OH} + \Delta Y_{IO}$ |
| $M = M_{OH} + \Delta M_{PO}$ | $M = M_{OH} + \Delta M_{IO}$ |
| $C = C_{OH} + \Delta C_{PO}$ | $C = C_{OH} + \Delta C_{IO}$ |
| $D = D_{OH} + \Delta D_{PO}$ | $D = D_{OH} + \Delta D_{IO}$ |
| for intermediate original | |
| $Y = Y_{OH} + \Delta Y_{MO}$ | |
| $M = M_{OH} + \Delta M_{MO}$ | |
| $C = C_{OH} + \Delta C_{MO}$ | |
| $D = D_{OH} + \Delta D_{MO}$ | |

As described above, the differences from the reference set values $\Delta K_U$ (K=Y, M, C, D; U=I, P, PO, IO, MS, MN, MO) are stored in RAM 192 in the operation of the present invention. However, since the values in parentheses are also subject to small changes, the values of $\Delta K_U$ stored in RAM 192 may be occasionally corrected by actual measurements with test charts, etc.

According to the present invention, the standard exposure conditions for the combinations of more than one type of original with more than one light-sensitive material are determined by adding $\Delta K_U$ pre-stored in RAM 192 to the reference values that have been preset automatically for the light-sensitive materials to be used. This method has the advantage that even if the type of original of interest is not appropriate for the light-sensitive material selected, standard exposure conditions can be easily set without performing copying test and desired image reproduction can always be ensured.

As already mentioned, reference values for soft light-sensitive materials are so set that they are appropriate for standard photographic originals, and those for normal light-sensitive materials and OHP light-sensitive materials are so set that they are appropriate for standard printed originals and standard OHP originals, respectively. Such reference values may be set by any known method such as, for example, manual setting with C, M, Y and D correction keys 206C, 206M, 206Y and 206D after standard originals are subjected to repeated copying test on predetermined light-sensitive materials. A preferred method is disclosed in commonly assigned U.S. patent application No. 4,860,059 and comprises making a copy on a test chart in a standard exposure condition setting mode, having the resulting test copy read by measuring means to determine standard exposure conditions, and using them as reference set values.

Such reference values may be set for each of the light-sensitive materials to be used. Alternatively, with the differences in reference value between light-sensitive materials ($\Delta Y$, $\Delta M$, $\Delta C$ and $\Delta D$) being preliminarily determined and stored in RAM 192, a copying test is performed only with respect to a certain reference light-sensitive material and the reference set values for it are corrected on the basis of the test result, with the reference set values for other light-sensitive materials being determined by adding $\Delta Y$, $\Delta M$, $\Delta C$ and $\Delta D$ to the so corrected reference set values. According to another method, initial reference set values for a plurality of light-sensitive materials are stored in RAM 192 at an initial time, say, at the time of system installation, and after correcting the reference set values for a particular light-sensitive material, the differences between the initial and corrected values are used as a basis for calculating corresponding differences with respect to the other light-sensitive materials, thereby setting the associated reference values.

The application of the image forming apparatus of the present invention is by no means limited to the silver halide photographic copying machine described above. The apparatus is also applicable to other copying machines including those which employ various light-sensitive materials such as pressure and light sensitive materials and photopolymers, as well as electrophotographic copiers, and also to various types of printers.

Having described the basic construction of the image forming apparatus according to the first aspect of the present invention, we now describe its operation below in a specific way.

The operation starts with placing a document (original) 130 on the platen 80 of the copier 10 (see FIG. 4) and closing the top cover 15. Then, copy start button (not shown) on the copier 10 is pressed, whereupon the light source 84 is lit to illuminate the document 130 and the light source unit starts scanning (prescanning is initiated).

The reflected light from the document 130 falls on the mirror 86 in the light source unit which is movable at the scanning speed. After reflection from the mirror 86, the light is further reflected by the mirrors 88 and 90 which are movable in the same direction as the light source unit at a speed one half the scanning speed. After passing through the lens unit 92, the light is reflected by the shutter 96 on the position indicated by the solid line in FIG. 4 and then reflected by the mirror 148 to be launched into the image sensor assembly 150. In this case, the filters and variable diaphragm stop in the lens unit 92 will not act on the optical path L and let the light pass through unimpeded.

The reflected light launched into the image sensor assembly 150 has its intensity measured with six sensors $150r_1$–$150b_2$ at each of the associated wavelengths. The values of measurements in the image sensor assembly 150 are sent to the document identifying section 152, where the values of measurements are processed by Discriminant Function 1 to identify the type of document 130 in such a way that color photographic originals are differentiated at least from color printed originals or black-and-white originals. The discrimination signal is then sent to the lens unit 92 or, if the system has a capability of automatically selecting the type of light-sensitive materials, to the light-sensitive material supply unit 16.

After completion of the prescanning operation described above, the light source unit and mirrors 88 and 90 return to the scan start position.

In the lens unit 92, predetermined correction is made for the quantity of light and color density as appropriate for the identified type of document according to the discrimination signal. If the system has a capability for automatically selecting the type of light-sensitive materials, a light-sensitive material as appropriate for the identified type of document is selected in the light-sensitive material supply unit 16.

For example, if the document 130 is a black-and-white original with the soft light-sensitive material 36 being selected by the user, the standard conditions for processing soft materials are adjusted by inserting the C filter into the optical path in the lens unit 92. If, on the other hand, the document 130 is a color photographic original with the contrasty light-sensitive material 34 selected by the user, the standard conditions for processing contrasty materials are adjusted by extracting the Y filter and opening the variable diaphragm stop by respective amounts of approximately 6 cc and 9 cc in the lens unit 92. In the latter case, if the contrasty light-sensitive material 34 is selected and the transport motor (not shown) driven in the light-sensitive material supply unit 16, transport rollers 42a and 42b feed the light-sensitive material 34 by a predetermined length, which is then cut to the necessary length with the cutter 44. Thereafter, the transport motor is driven again to feed the light-sensitive material 34 to the exposure section 46 where it stops temporarily just in front of the exposing position 46a.

When the shutter 96 rotates until it comes to the position indicated by the dashed line in FIG. 4, it becomes possible to effect exposure by scanning. As soon as the light source unit starts main scanning, the transport rollers 58a, 58b, 60a and 60b in the exposure section 46 start to transport the light-sensitive material 34 at a speed in synchronism with the scanning by the light source 84.

During the main scanning period, the reflected light from the mirror 86 moving at the scan speed is further reflected by the mirrors 88 and 90 moving in the same direction as the mirror 86 at a speed one half the scan speed. The reflected light is transmitted through the lens unit 92 that has been properly adjusted in terms of color and aperture according to the selected type of document, and the light is focused at the exposing position 46a (exposure plane) to expose the light-sensitive material 34 being transported in synchronism with the scan speed.

As the exposure proceeds, the light-sensitive material 34 is passed between transport rollers 58a and 58b and between transport rollers 60a and 60b and sent further downward by passing through the transport guide 62. In this case, the switching guide 64 does not act on the transport route of the light-sensitive material and the material 34 being sent from the exposure section 46 is moved down vertically through the transport guide 62. The exposed light-sensitive material 34 is thereafter sent into the processing section 22 of the processing unit 20 but because of its vertical downward movement, there will be no slackening of the middle portion of the light-sensitive material 34 due to the difference in speed between the light-sensitive material supply unit 16 and the processing section 22.

When the exposure is completed, the shutter 96 rotates until it comes to the position indicated by the solid line in FIG. 4, and all transport rollers rotate in reverse direction for a short period of time while the developed light-sensitive material 34 ascends through the transport guide 62, with part of it being fed into the transport guide 48c. The reverse transport of the light-sensitive material 34 continues until its leading edge comes to a position upstream of the switching guide 64.

Thereafter, each of the transport rollers is rotated in the same direction as they were previously rotated. In this second case of rotation, the switching guide 64 acts on the transport route of the light-sensitive material and separates the leading edge of the light-sensitive material 34 from the transport guide 62 so that it is fed to the branching transport guide 66. As a result, the leading edge of the light-sensitive material passes along the branching transport guide 66 to be fed into the processing section 22 of the processing unit 20.

The exposed light-sensitive material 34 which has been fed into the processing section 22 is developed in the developing tank 102, bleached and fixed in the bleach-fixing tank 104 and thoroughly rinsed in the washing tanks 106 and 108 before it is sent to the drying zone 24. The dried light-sensitive material 34 is fed to the receiving tray 110.

While the image forming apparatus of the present invention has basic construction described above, it should be noted that the present invention is by no means limited to the particular embodiments described above and that various improvements and design modifications may be possible without departing from the spirit and scope of the invention.

In the image forming apparatus according to the first aspect of the present invention, the reflected light from an original of interest is measured with two sensors for the light of each of three primary colors having sensitivity peaks at different wavelengths within the associated wavelength range. The resulting six values of measurements are used as parameters for a discriminant function and the value of this function is used as the criterion for differentiating one type of original from another. Unlike the prior art methods of identification which need to combine a plurality of mathematical formulas, the present invention uses only one discriminant function and yet is capable of automatically identifying the type of the original by discriminating color photographic originals at least from color printed originals or black-and-white originals in an easy and reliable way through a simple control system. The apparatus of the present invention then forms a desired image according to the identified type of original without giving any unwanted color shades that may deteriorate the color balance and quality of the reproduced image.

The image forming apparatus according to the first aspect of the present invention has the added advantage that even an operator who is not skilled in identifying various types of originals is capable of forming a desired image by automatically correcting the exposure amount and colors in an appropriate manner (i.e. matching the identified type of original) and by selecting an appropriate light-sensitive material. As a result, even unskilled operators are always capable of reproducing satisfactory image that has good color balance without any undesired shades.

In the following pages, we describe the second aspect of the present invention with reference to FIGS. 1-5 and FIGS. 8-10.

The second aspect of the present invention is also directed to identification of the type of a color original, which is necessary when determining the conditions for effecting image formation as appropriate for color originals (e.g. exposure conditions such as those relating to color filters and aperture stop) and selecting the appropriate light-sensitive material. According to the second aspect of the present invention, mathematical operations for identifying the type of original are performed, with photometric values below a predetermined low level and/or those values exceeding a predetermined high level being excluded from the values of measurements within a photometric region including the color original of interest. This offers the advantage of identifying the type of the original in an accurate way even if it is an original of small size or irregular sizes or is a thick book or a bulky material that need copying with the top cover of the copier left open.

The method of identifying the type of original with an image forming apparatus according to the second aspect of the present invention is described below in detail. The reflected light from a predetermined photometric region of the platen glass which includes a color original of interest is measured with at least two sensors for the light of each of three primary colors, for example, red (R), green (G) and blue (B), or for the light of at least one primary color, where the sensors have sensitivity peaks at different wavelengths within the wavelength regions of the light of three primary colors or within the wavelength region of said at least one primary color. The resulting plural, say, six, values of photometric measurements are used as parameters of a discriminant function and the value of this function is used as the criterion for identifying the type of the original by discriminating at least color photographic originals from another type of originals such as color printed originals or black-and-white originals. In performing mathematical operations for identification, its precision is further improved by excluding predetermined lower levels and/or predetermined higher levels from the values of photometric measurements with the sensors.

The following description assumes a typical case where a total of six sensors are used, with each of three primary colors being measured with two sensors. The term "photometric region" as used herein means the area of the platen glass from which light is reflected to be received by the sensors when the image information in the color original placed on the platen glass is read or when prescanning is performed. The photometric region may be equal to the area of the platen glass or to the size of the documents which are the largest of all of the color documents to be copied. Alternatively, the photometric region maybe set as a region that matches the length of photometric scanning. It should however be noted that in the present invention, the photometric region is preferably determined according to the light-sensitive material on which image is to be formed.

If the type of original is to be identified by prescanning, a single preset region of prescanning may be used as the photometric region. Alternatively, the photometric region may be of the same size as a selected light-sensitive material, typically of a regular size such as B5, B4, A4 or A3, or maybe slightly larger than these sizes.

An image forming apparatus that uses a predetermined area of the platen glass as the photometric region suffers a certain problem if a color original smaller than the photometric region or one of an irregular size is set on the platen glass and held in position with a top cover the underside of which is white. That is, when the original is scanned photometrically by illuminating light in slit form, part of the illumination passes through non-document area of the platen glass and is reflected by the white underside of the top cover to be launched into the photometric means. As a result, if copying is done in the presence of many areas that do not contain the document, the photometric densities at small portions of the non-document area will appear very frequently within the range of the lowest density level. This may be represented by a histogram in FIG. 8 which plots photometric densities at individual small portions of the document area.

If color originals smaller than the photometric region or those which are of irregular sizes are copied with the top cover left open, or in the case where a certain page or pages of the thick book are copied while it is placed face down on the platen glass with the top cover left open, the document is not present in the photometric region or a large hollow portion forms in the area which should inherently belong to the document region, and the illuminating light will pass unimpeded through that area of the platen glass which corresponds to the hollow portion, with the consequent result that there will be little or no light that is reflected to be incident on the photometric means, thus producing very high photometric densities in that non-document area or the document area which corresponds to the hollow portion. Therefore, in the case where the photometric region contains many non-document areas of hollow portions, the photometric densities at small portions of each non-document area or each of the areas which correspond to the hollow portions will appear very frequently within the range of the highest density level. This may be represented by a histogram in FIG. 9 which plots the photometric densities at the individual small portions of the document area.

Similar problems occur with packages or bulky materials since they are copied without being held with the top cover or because not every part of them can be placed in close contact with the platen glass during copying.

Hence, in order to ensure correct identification of the type of a color original of interest, the present invention employs six sensors to obtain photometric data which consists of six values of measurements that are conducted at two wavelengths for the light of each of three primary colors. Aside from the purpose of identifying the type of original, the photometric data obtained is used to identify and calculate other factors including image density, contrast, image areas, their densities, the background, its density, the black background and its density. Photometry is performed at a predetermined number of measuring points (or lines or pixels) taken on the color original at given intervals in a certain direction, for example, the scanning direction in the case of exposure by scanning. If exposure is to be effected by scanning through a slit, photometry is desirably conducted at intervals that are at least smaller than the width of slit in the scanning direction. If the number of points of photometry conducted in this way is written as n, the number of values of photometric measurements is $6n$ ($r1_1, \ldots r1_n, r2_1, \ldots r2_n, g1_1, \ldots g1_n, g2_1, \ldots g2_n, b1_1, \ldots b1_n, b2_1, \ldots b2_n$) because R, G and B sensors measure density at two wavelengths for each color.

Figure 8:
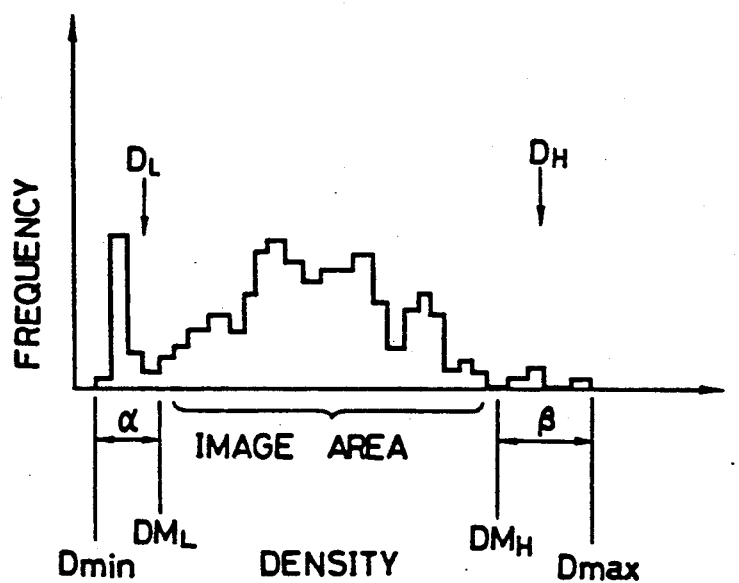
FIG. 8 is a histogram of the densities obtained by performing photometric measurements on a color original smaller than the region of photometry in an image forming apparatus according to the second aspect of the present invention.
Figure 9:
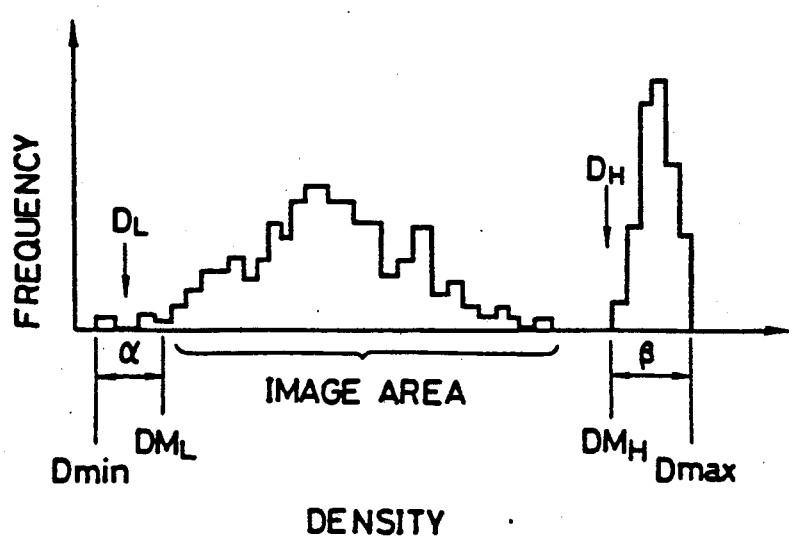
FIG. 9 is a histogram of the densities obtained by performing photometric measurements on a color original in the image forming apparatus of the present invention, which original produces either hollow portions in the region of photometry or non-document areas.

According to the present invention, if densities $r1_i$, $r2_i$, $g1_i$, $g2_i$, $b1_i$ and $b2_i$ measured at a certain point i (the ith point of measurement) are within predetermined ranges and if the differences between these densities and those densities $r1_j$, $r2_j$, $g1_j$, $g2_j$, $b1_j$ and $b2_j$ measured at an adjacent point j (the jth point of measurement), as expressed by $$\Delta r1_i = |r1_j - r1_i|$$

$$\Delta r2_i = |r2_j - r2_i|$$

$$\Delta g1_i = |g1_j - g1_i|$$

$$\Delta g2_i = |g2_j - g2_i|$$

$$\Delta b1_i = |b1_j - b1_i|$$

$$\Delta b2_i = |b2_j - b2_i|$$

are within predetermined ranges (i.d., there are predetermined changes in density), then the point of measurement i is judged to be within an image area and the average density of that image area taken as a whole is used as the corrected image area density (DM). The procedure may be described more specifically as follows: on the basis of the color density distributions at certain points of measurement where the values of $\Delta r1_i$, $\Delta r2_i$, $\Delta g1_i$, $\Delta g2_i$, $\Delta b1_i$ and $\Delta b2_i$ are within predetermined ranges, histograms are constructed for the average density distributions of three colors at the respective points as shown in FIGS. 8 and 9, and the density of the image area (DM) is determined by calculating the average density without counting in the low-density area whose density is within a predetermined range of from $D_{min}$ to $D_{min} + \alpha$ or the high-density area whose density is within another predetermined range of from $D_{max}$ to $D_{max} - \beta$. Thus, areas in which the change in density is nil or very small, as well as the low-density and high-density areas shown to be within the ranges of from $D_{min}$ to $D_{min} + \alpha$ and from $D_{max}$ to $D_{max} - \beta$ in FIG. 8 to 9 will not be regarded as part of the image region.

In identifying the image region and calculating the density of that image region, not all of the photometric values from the six sensors described above need be employed and instead, photometric data consisting of a given combination of values at a single wavelength for each of R, G and B, i.e., $r1_i$, $g1_i$ and $b2_i$ ($i=1-n$), may be used. Thus, unless otherwise noted, the following description concerns a typical case where the values in the red, green and blue regions are represented by $r1_i$, $g1_i$ and $b2_i$ ($i=1-n$), respectively.

In the present invention, if at least one of the values $r1_i$, $g1_i$ and $b2_i$ is less than a given density $D_{min}+\alpha$, the point of measurement i is taken to be within the background region and the average density of the whole background region is used as the background density (DB). If the background density is less than a predetermined low level, the background area is not counted in the performance of mathematical operations for identifying the type of original of interest.

In the present invention, if at least one of the values $r1_i$, $g1_i$ and $b2_i$ is greater than a given density $D_{max}-\beta$, the point of measurement i is taken to be within the black background region and the average density of the black background region is used as the black background density (DBB). If the black background density is greater than a predetermined high level, the black background area is not counted in the performance of mathematical operations for identifying the type of original of interest.

The density level $D_{min}+\alpha$ ($DM_L$) by which to separate the image region and the background region, and the density level $D_{max}-\beta$ ($DM_H$) by which to separate the image region and the black background region may be determined from the histograms of FIGS. 8 and 9 by the following procedure. The first step is to determine the values of a minimum density $D_{min}$ and maximum density $D_{max}$ within the photometric region. While the value of minimum density $D_{min}$ can be determined by an actual photometric measurement, the density value of the white color presented by the underside of the top cover in a copier may be substituted. The value of maximum density $D_{max}$ can be determined by an actual photometric measurement but other values can also be used, such as a value separately set for the density of black color and the value of photometric density for the case where neither document nor top cover is present on the platen glass.

The values of $\alpha$ and $\beta$ are determined to lie within the respective ranges of approximately from 1 to 20 and from 5 to 50. The value of $\alpha$ may be set in such a way as to include the density of the platen and the white underside of the top cover or the white background of ordinary documents. The value of $\beta$ may be determined by the precision of photometric measurements with sensors or by the maximum density of ordinary reflection-type originals which normally lies between 150 and 200.

Within certain density ranges (e.g. $\alpha<20$, $\beta<50$), the value of density at frequency zero or at the lowest frequency on histograms (as indicated by $D_L$ and $D_H$ in FIGS. 8 and 9) may be detected and counted in the image region.

In short, the values of $D_{max}$, $D_{min}$, $\alpha$ and $\beta$ may be set either preliminarily or during photometric measurements with sensors.

The method of identifying the type of originals according to the second aspect of the present invention is in no way limited and except for the need to perform mathematical operations only on predetermined levels of the values of photometric measurements with sensors, identification may be conducted by the same procedures as those which are employed in the first aspect of the invention utilizing the differences in spectral reflection density distributions for three types of originals as depicted in FIG. 1. Thus, there will be no need for detailed discussion in this matter.

The operation of the second aspect of the present invention is described below more specifically with reference to the case where, as in its already described first aspect, values of photometric measurements, r1, r2, g1, g2, b1 and b2, which were conducted with the six sensors shown in FIG. 2 and 3 are used as parameters of Discriminant Function 1 also described above.

DISCRIMINANT FUNCTION 1

$Z = a_1 + a_2*r1 + a_3*g1 + a_4*b2 + a_5*R + a_6*G + a_7*B$ where R, G and B represent $r'b-r2$, $g2-g1$, and $b2-b1$, respectively. Coefficients $a_1-a_7$ are so determined that the ratio of $S_B$ to $S_W$ for color photographic originals and color printed originals or black-and-white originals will assume the highest value.

The threshold value $L_P$ for discriminating color photographic originals from color intermediate originals and the threshold value $L_I$ for discriminating color printed originals from color intermediate originals can be determined through actual measurements on a number of samples. In one example, 300 samples each of color photographic and printed originals of size A4 were subjected to reflection density measurements under illumination with a halogen lamp (rated at 80 V and 150 W) using the image sensor assembly 150 shown in FIG. 5 which consisted of six sensors $150r_1$, $150r_2$, $150g_1$, $150g_2$, $150b_1$ and $150b_2$. In the measurements with the sensors, the reflected light from each original was shaped to a slit of the size 10 mm×100 mm and the average of 70 values of reflection density measured at intervals of 3 mm along the 210 mm side of A4 size sheet was taken as r1, r2, $L_P$ and $L_I$ as were determined from the results of these photometric measurements were as follows:

$a_1 = -14.33$
$a_2 = -0.11$
$a_3 = -0.37$
$a_4 = 0.45$
$a_5 = 1.19$
$a_6 = -0.67$
$a_7 = -0.96$
$L_I = -5$
$L_P = 5$

In this case, the values of DB (density of the background) smaller than 10 and the values of DBB (density of the black background) higher than 200 shall be excluded from the photometric data. Consequently, the color original of interest is judged to be printed matter if $Z \leq -5$ in Discriminant Function 1, and it is judged to be a photograph if $Z \geq 5$. The original is judged to be an intermediate one if $-5 < Z < 5$.

When the image forming apparatus according to the second aspect of the present invention is to be used, it may be applied to a silver halide photographic copier of the type shown in FIG. 4 in connection with the first aspect of the invention. The original identifying section used in this copier may be of the same type as shown in FIG. 5. Thus, there will be no need for detailed discussion of the copier and the original identifying section that can be used in the second aspect of the present invention.

The following experiment was conducted with the copier 10 shown in FIG. 4 using the sensor assembly 150 shown in FIG. 3. Two types of color original of size E were placed on the platen glass; after identifying the type of each original by prescanning in the original identifying section shown in FIG. 5, copying was made at a ratio of 200%. The coverage of prescanning was equivalent to size A4.

The photometric data obtained by prescanning with the six sensors described above was subjected to identification by Discriminant Function 1. When the value of Z of Discriminant Function 1 was equal to or greater than 5, the original was judged to be a photograph; when $Z \leq -5$, it was judged to be printed matter; and when $-5 < Z < 5$, it was judged to be an intermediate original.

In the experiments conducted in accordance with the present invention, all the image data and information obtained by prescanning was used for identification purposes when the density of the background (DB) was equal to or greater than 10 and the density of the black background (DBB) was equal to or less than 200, but when $DB < 10$ or $DBB > 200$, the image data for the background region was excluded from the performance of mathematical operations for identifying the type of original.

In the comparative experiments, mathematical operations for identifying the type of original were performed using all the image data irrespective of the value of DB and DBB.

The results of these experiments are shown in Table 2 below.

|  | Comparative Experiment | Experiment of the Invention | Comparative Experiment | Experiment of the Invention |
| --- | --- | --- | --- | --- |
| r2 | 15 | 36 | 33 | 42 |
| g1 | 14 | 34 | 32 | 40 |
| b2 | 13 | 30 | 28 | 36 |
| r2−r1 | 2 | 7 | 6 | 8 |
| g2−g1 | 0 | −2 | −2 | −2 |
| b2−b1 | −9 | −21 | −17 | −20 |
| DB | 1 | 1 | 2 | 2 |
| Z | −4.29 | 12.46 | 7.6 | 12.51 |

When making an enlarged copy of a small (e.g. E size) color photographic original, prescanning is performed in such a way as to cover the light-sensitive material on which image is to be formed (e.g., the coverage is equivalent to size A4 at a copying ratio of 200%) but then even the light reflected from the non-document area of the white underside of the top cover will be launched into the sensors, thus causing erroneous photometry. According to the present invention, the type of original is identified after excluding those values of photometric measurements which correspond to the level of the reflected light from the white side of the top cover. Therefore, as is clear from Table 2, even color photographic originals that were so small in size as to be often judged as intermediate or color printed originals by the prior art could be correctly identified as color photographic originals.

Figure 10:
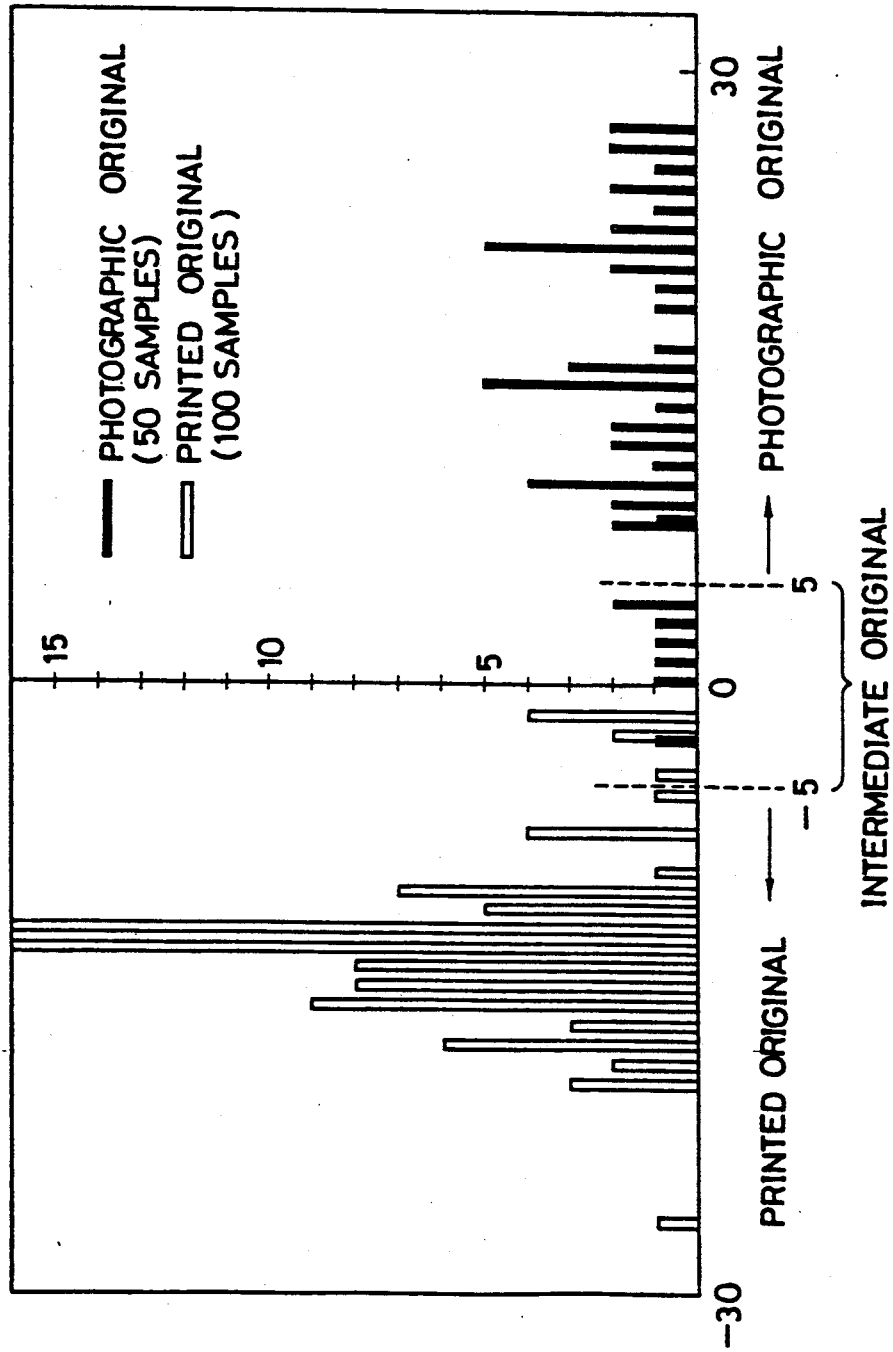
FIG. 10 is a graph showing the results of identifying the type of color originals with the image forming apparatus of the present invention.

A similar experiment was conducted on 150 samples of color original shaving different densities (100 of them were printed matter and 50 were photographs) using the image forming apparatus of the present invention to identify the type of individual samples. The results are shown in FIG. 10, from which one can see that of the 100 samples of color printed original, 7 were identified as intermediate originals and the remainder were correctly identified as color printed matter, with none being judged as photographs. On the other hand, of the 50 samples of color photographic originals, 7 were identified as intermediate originals and the remainder were correctly identified as photographs, with none being judged as printed matter.

As these results show, the image forming apparatus of the present invention is capable of correctly identifying the type of originals and hence, the image formed has satisfactory color and quality.

As described on the foregoing pages, the image forming apparatus according to the second aspect of the present invention discriminates color photographic originals at least from color printed originals on the basis of the values of photometric measurements conducted on the reflected light from a photometric region including a color original of interest. Mathematical operations for identification purposes are performed, with photometric values below a predetermined low level and/or those values exceeding a predetermined high level being excluded from said values of photometric measurements. This approach offers the advantage of precisely discriminating color photographic originals at least from color printed originals even if a color original smaller than the photometric region causes the sensors to measure the reflected light from the white underside of the top cover as if it were an image area, or even if a thick book, a package or some other bulky material causes the sensors to perform photometry on the large hollow portion or non-document area which is often produced on account of copying with the top cover left open. Since precise discrimination is achieved, the image forming apparatus of the present invention is capable of forming image of high quality having good color balance that is appropriate for the identified type of original. Thus, the image forming apparatus according to the second aspect of the present invention proves to be very effective in making enlarged copies of color originals.

The image forming apparatus according to the second aspect of the present invention has the added advantage that even an operator or user who has no expertise in correctly identifying various types of color originals is capable of automatically performing appropriate correction of exposure amount and color according to the specific type of original no matter what size or shape it has. Further, the operator or user is capable of selecting the appropriate kind of light-sensitive material, thereby ensuring the formation of a desired image with consistent quality.

An image forming apparatus according to the third aspect of the present invention is hereunder described with reference to FIG. 4 and FIGS. 11-15. The procedure followed by the image forming apparatus according to the third aspect of the present invention comprises the following steps: prescanning a color original on the platen and reading the color density of the color original at given intervals to measure the densities of R (red), G (green) and B (blue) colors at a number of points over the entire region of the original, thereby obtaining a density distribution for each color, with the area that contains a density change of a predetermined amount being designated as an image area; constructing a density histogram from said color density distribution;

calculating the average density of the image area, with the high-density and low-density areas within predetermined ranges being excluded, so as to obtain the density of the image area; obtaining a density distribution with an area, the color density of which is below a predetermined level being designated as a background area; determining both the background density which is the average density of the background area and the proportion of the background area; constructing discriminant formulas containing the image area density, background density and the proportion of the background area as three parameters; identifying a low-density, low-contrast original on the basis of the constructed discriminant formulas; and performing a predetermined density correction on the so identified low-density, low-contrast original.

In the case of reproducing the image of a low-density, low-contrast original such as a map on a contrasty light-sensitive material, the image forming apparatus of the present invention adds an aperture condition of a predetermined amount to the standard exposure conditions optimal for exposing said contrasty light-sensitive material to obtain a latent image on a standard original that is optimal for said light-sensitive material, and exposure is performed with a reduced amount of exposing light. This is effective in reproducing a low-density, low-contrast image of high quality that is free from blocking of shadows and skipping of colors and which yet has improved color density reproduction in the low-density areas.

If the original to be copied has a wide white background in spite of its low density, the aperture condition is not corrected by such a method as reduction in the amount of exposure and this enables the color density of the original to be faithfully reproduced, thereby producing an image of high quality that is free from fogging of the white background.

FIG. 11 shows the essential part of the image forming apparatus 220 according to the third aspect of the present invention which includes an image exposing unit. Except for an image sensor assembly and an exposure control system, the image exposing unit generally indicated by 230 in FIG. 11 is essentially the same as the exposing unit 18 in the silver halide photographic copier 10 shown in FIG. 4 and like components are identified by like numerals to eliminate the need for describing the image exposing unit 230 in great detail. The image forming apparatus 220 has a light-sensitive material supply unit and a light-sensitive processing unit but their description is omitted since they can be replaced by the light-sensitive material supply unit and processing unit 20 which are used in the copier 10 shown in FIG. 4.

As shown in FIG. 11, the image exposing unit 230 has a transparent platen 80 on its top. When a color original 130 is placed face down on the platen, it is held in position by means of a top cover 15 the underside of which is white. At the left end of the platen, a standardized reflection member 81 is provided on the underside and the reflected light from this member is measured to adjust the white (or gray) balance.

The image exposing unit 230 has a light source unit 83 for scanning the underside of the original 130. The light source unit 83, which is capable of reciprocating in parallel with the platen 80, has incorporated therein a light source 84, a slit 85a, a reflector 85b and a first mirror 86, all of which are elongated and directed into the paper. The illumination from the light source 84 is reflected by the original 130 and passes through the slit 85a to form slit light, which is reflected by the first mirror 86 to be launched into a mirror unit 87.

The mirror unit 87 consists of a second elongated mirror 88 and a third elongated mirror 90 that are capable of synchronized movement in the same direction as the light source unit 83 at a speed one half the scan speed and which are positioned to face each other at an angle of 45° with respect to the optical path. Because of this mirror arrangement, the unit 87 permits the light from the light source unit 83 to be reflected to travel on the return path to be launched into a lens unit 92.

The lens unit 92 has an imaging front lens group 154 and an imaging rear lens group 156 for focusing the image of the original 130 on the light-sensitive material 34 (or 36) being transported in synchronism with the light source unit 83. A yellow filter Y, a magenta filter M and a cyan filter C are disposed between the front and rear lens groups. Behind the rear lens group 158 is disposed an aperture stop 162 that consists of two plates 158 and 160 which are movable in opposite direction to adjust the quantity of light. Color filters Y, M and C are movable in a direction perpendicular to the optical axis and by controlling the amount in which they are inserted into the optical path, the quality of slit light is adjusted to compensate for the color balance. In order to change the copying ratio, the optical path length is adjusted by moving the lens unit 92 in either of the directions indicated by arrows in FIG. 11.

The light-sensitive material 34 (or 36) being transported in synchronism with the light source unit 83 as it is held between a pair of nip rollers 58a and 58b and between another pair of nip rollers 60a and 60b is exposed at the exposing position 46a with the light that has been adjusted in terms of quantity, quality and focal point by means of the lens unit 92. Needless to say, the exposure section 46 in which the exposure position 46a is located is defined by opening an elongated shutter 96 as indicated by the solid line in FIG. 11.

When the white balance is to be corrected or when information is read from the image of the original by prescanning, the shutter 96 is closed as indicated by the dashed line in FIG. 11 and the image produced from the white standardized reflection member or the image of the original is reflected by the shutter 96 and launched into an image sensor assembly 232, thereby identifying the type of original, its color density and other factors for determining the corrected exposure conditions.

The image sensor assembly 232 has the following components incorporated therein: a mirror 234 by which part or all of the slit light reflected from the shutter 96 and launched into the image sensor assembly 232 is reflected in a horizontal direction; light condensing means 236 in the form of a lens, Fresnel lens, condenser mirror or the like for condensing the slit light reflected from the mirror 234; and photometric means 238 for measuring the slit light as it remains condensed by the condensing means 236. As shown in FIG. 12, the photometric means 238 is composed of a red (R) sensor 238a, a green (G) sensor 238b and a blue (B) sensor 238c and performs photometry on the three primary components of the reflected slit light. The three primary components as assumed herein are red (R), green (G) and blue (B) but other combinations maybe selected, such as Y, M and C.

According to the third aspect of the present invention, the color original 130 is prescanned and subjected to photometry with the image sensor assembly 232 for identifying the type of original, its density and contrast.

Photometry is performed at a predetermined number of measuring points (or lines or pixels) taken on the original 130 at given intervals in the scanning direction. When exposure is to be performed by scanning through a slit as in the image forming apparatus 220 shown in FIG. 11, photometry is preferably conducted at intervals of $d_m$ which are at least smaller than the width (S) of slit 85a as taken in the scanning direction. If the number of points of photometry conducted in this way is written as n, the number of values of photometry obtained with R, G and B sensors 238a, 238b and 238c is 3n for the three colors.

Figure 13:
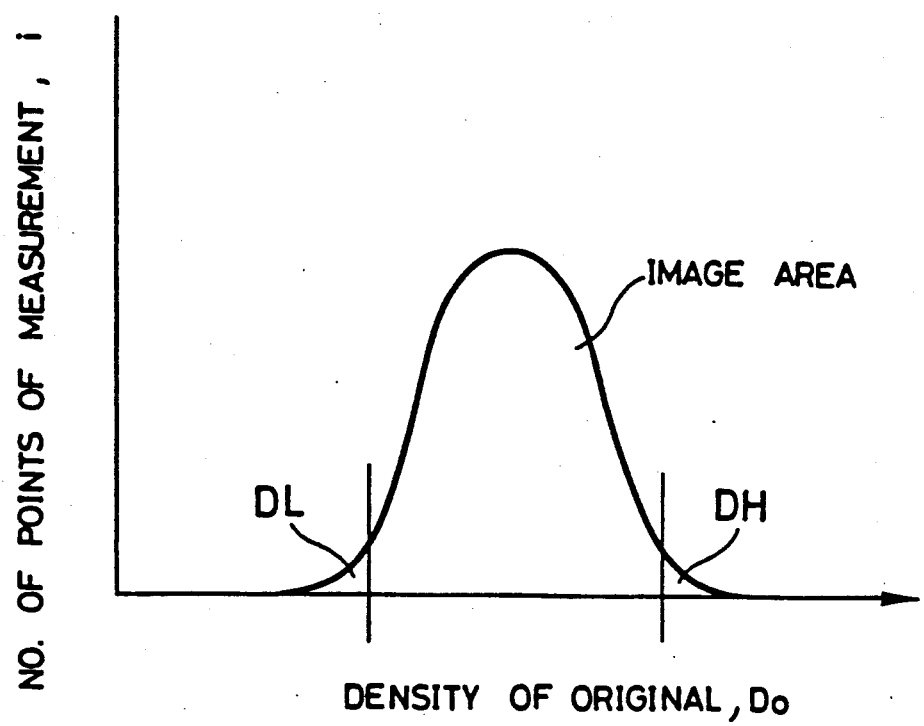
FIG. 13 is a graph showing the envelope of the histogram of document density distribution constructed with the image forming apparatus of the present invention.

According to the present invention, if densities $R_i$, $G_i$ and $B_i$ measured at a certain point i (the ith point of measurement) are within predetermined ranges and if the differences between these densities and those densities $R_j$, $G_j$ and $B_j$ measured at an adjacent point j (the jth point of measurement), as expressed by $$\Delta R_i = |R_j - R_i|$$

$$\Delta G_i = |G_j - G_i|$$

$$\Delta B_i = |B_j - B_i|$$

are within predetermined ranges, then the point of measurement i is judged to be within an image area and the average density of that image area taken as a whole is used as the image area density (DM). The procedure may be described more specifically as follows: on the basis of the color density distributions at certain points of measurements where the values of $\Delta R_i$, $\Delta G_i$ and $\Delta B_i$ are within predetermined ranges, a histogram is constructed for the average density distributions of three colors at the respective points as shown in FIG. 13 (only the envelope of the histogram is shown), and the density of the image area (DM) is determined by calculating the average density without counting in the low-density area (DL) whose density is below a predetermined low density level and the high-density area (DH) whose density is higher than a predetermined high density level. Thus, areas in which the change in density is nil or very small, as well as the low-density and high-density areas indicated by DL and DH in FIG. 13 will not be regarded as part of the image area. However, for the sake of convenience, the average density of the original may be regarded as the image area density (DM).

In the present invention, if at least one of $R_i$, $G_i$ and $B_i$ is less than the predetermined density DL, the point of measurement i is regarded as being located in the background area and the average density of this background area taken as a whole is used as the background density (DB). The proportion of the original 130 occupied by the background area is referred to as the proportion of background area (KB).

The three parameters thus obtained, i.e., image area density (DM), background density (DB) and the proportion of background area (KB), are used to identify a low-density, low-contrast original by either one of the following discriminant formulas:

DISCRIMINANT FORMULA 2

If DM≦D11 and DB≧DL1 and KB≦KL1, or if DM≦D11 and DB≦DL2 and KB≦KL2, then the color original 130 is identified as a low-density, low-contrast original 1.

DISCRIMINANT FORMULA 3

If D11<DM<D12 and DB≧DL1 and KB≧KL1 or if D11<DM<D12 and DB≦DL2 and KB≦KL2, then the color original 130 is identified as a low-density, low-contrast original 2.

In Discriminant Formulas 2 and 3, DL1>DL2 and KL1>KL2.

Figure 14:
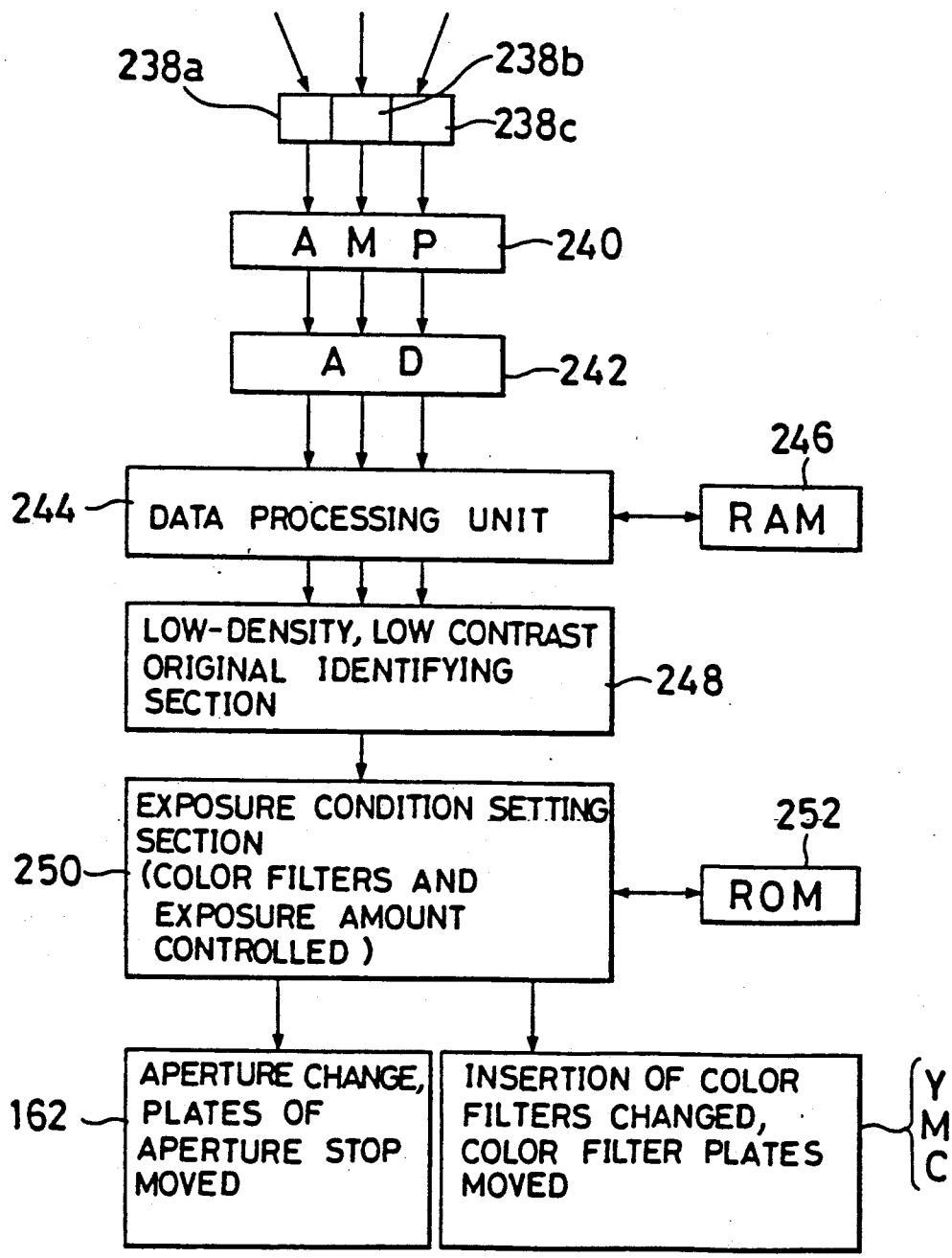
FIG. 14 is a block diagram showing the control unit of the image forming apparatus of the present invention.
Figure 15:
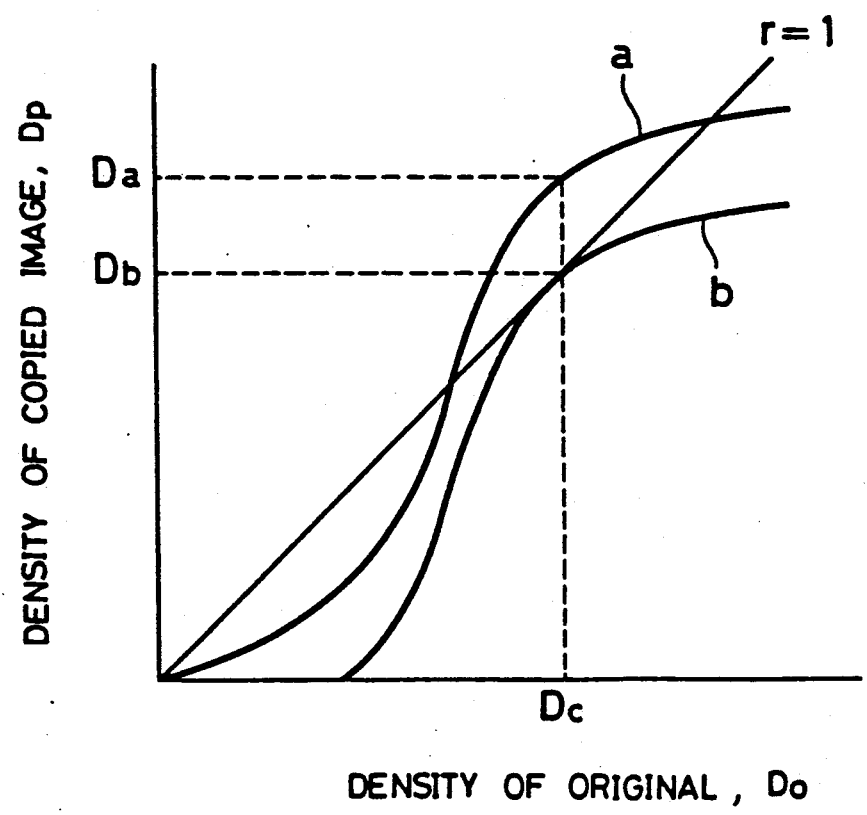
FIG. 15 is a graph showing the procedure of density correction performed in a prior art image forming apparatus.

The process of identifying the type of original using the image forming apparatus 220 shown in FIG. 11 may proceed as shown in FIG. 14. Prior to color copying, the color original is prescanned for photometry, which is conducted for three colors, R, G, and B, with the associated color sensors 238a, 238b and 238c at predetermined points of measurements spaced by given intervals.

Each of the outputs form sensors 238a, 238b and 238c is amplified with an amplifier (AMP)240 and thereafter converted to a density signal in an A/D converter 242.

The density signals for three colors, $R_i$, $G_i$ and $B_i$, as obtained at each point of measurement are sent to a RAM 245 via a data processing unit 244. After prescanning, the data processing unit 244 reads the color density signals for the respective points of measurement from a RAM 246 to obtain the density distribution of each color. On the basis of the resulting color density distributions, three parameters, i.e. image area density (DM), background density (DB) and the proportion of background area (KB), are calculated and compared with predetermined reference values. The result of comparison is sent to a low-density, low-contrast original identifying section 248, where checking is made as to whether the color original 130 is a low-density, low-contrast original.

The result of identification of low-density, low-contrast originals is sent to an exposing condition setting unit 250, where appropriate exposure conditions are set by reference to a ROM 252 which has stored therein the standard exposure conditions for the combinations of various types of originals and light-sensitive materials.

If the original of interest is identified as a low-density, low-contrast type, appropriate exposure conditions are set by adding either one of following values to the standard set values for exposing a contrasty light-sensitive material such as one for making image from printed matter (11) or and OHP light-sensitive material (12):

1. $\Delta D_{L11i}$ (i=1, 2) if the original is low-density, low-contrast original; or
2. $\Delta D_{L21i}$ (i=1, 2) if the original is low-density, low-contrast original 2.

Typical examples of setting exposure conditions that are appropriate for the type of originals as identified by the present invention are given below.

EXAMPLE 1

When the standard exposure conditions set for a normal light-sensitive material (11) which is a contrasty light-sensitive material to be used in forming image from printed originals consist of a yellow filter being $Y_N$, a magenta filter being $M_N$, a cyan filter being $C_N$ and an aperture being $D_N$, the following exposure conditions (filter conditions) are selected if the original of interest is to be used with a normal light-sensitive material (11), is printed matter and has been identified as low-density, low-contrast original 1:

$Y = Y_N$ $M = M_N$ $C = C_N$
$D = D_N + \Delta D_{L11i}$.

EXAMPLE 2

If the original of interest is a photograph and has been identified as low-density, low-contrast original 2, and if a normal light-sensitive material (11) is to be used in forming image of this original, the following exposure conditions are selected:

$Y = Y_N + \Delta Y_P$ $M = M_N + \Delta M_P$ $C = C_N + \Delta C_P$ $D = D_N + \Delta D_P + \Delta D_{L211}$ where $\Delta Y_P$, $\Delta M_P$, $\Delta C_P$ and $\Delta D_P$ are the amounts by which the values of Y, M, C and D of the photographic original are corrected for the normal light-sensitive material (11).

EXAMPLE 3

When the standard exposure conditions set for an OHP light-sensitive material (12) which is to be used in forming image from standard OHP originals consist of $Y_{OH}$, $M_{OH}$, $C_{OH}$ and $D_{OH}$, the following exposure conditions are selected if the original of interest is to be used with an OHP light-sensitive material (12), is an OHP original and has been identified as low-density, low-contrast original 1:

$Y = Y_{OH}$
$M = M_{OH}$
$C = C_{OH}$
$D = D_{OH} + \Delta D_{L112}$.

If the exposure conditions are set by the procedure described above, according to these conditions the color filters Y, M and C in the lens unit 92 shown in FIG. 11 are moved by means of a drive source such as a motor to change the amount of their insertion into the optical path, whereas the plates 158 and 160 making up the diaphragm stop 162 are moved by means of a drive source such as a motor to change the amount of exposure (see FIG. 14). In this way, the image forming apparatus 220 shown in FIG. 11 effects appropriate image reproduction from low-density, low-contrast originals.

Prior to image formation, the contrasty light-sensitive material 34 appropriate for use with color printed originals, or the soft light-sensitive material 36 appropriate for use with color photographic originals (or the OHP light-sensitive material) is fed into the exposing section 46 from a light-sensitive material supply unit (not shown). As already mentioned, the light-sensitive material supply unit may be of the same construction as the light-sensitive supply unit 16 in the copier 10 shown in FIG. 4. The appropriately exposed light-sensitive material may be subjected to wet processing in the processing unit 20 in the copier 10 if it is a silver halide photographic material.

The image forming apparatus according to the third aspect of the present invention has been described above with reference to the typical case where it is a silver halide photographic copier that employs the image exposing apparatus shown in FIG. 11. It should, however, be noted that this is not the sole example of the present invention and the concept described on the foregoing pages is applicable to any kind of image forming apparatus that uses light-sensitive materials which, in addition to silver halide photographic materials, include pressure-sensitive, light-sensitive materials, photopolymers, thermographic light-sensitive materials and diazo light-sensitive materials. Besides the basic construction described above, various improvements and design modifications are possible without departing from the spirit and scope of the present invention.

The third aspect of the present invention may be summarized as follows: the color density information of the image of an original of interest is read during prescanning to obtain the density distributions of three primary colors; three parameters are obtained by performing predetermined mathematical operations on said color density distributions; discriminant formulas containing the three parameters is used to determine if the original is a low-density, low-contrast original; if a low-density, low-contrast original such as a map is to be used to form image on a contrasty light-sensitive material, the amount of exposure is reduced and appropriate correction is made with respect to density, so as to achieve improved reproduction of color density in the low-density area; in other cases such as where the low-density original has many white background areas, density correction is not performed by reducing the amount of exposure or by any other methods and instead, preferential color formation is effected in the white background, with consequent formation of a satisfactorily reproduced image which has no problems such as fogging of the white background.

Hence, the image as reproduced with the image forming apparatus according to the third aspect of the present invention is of high quality in that it features satisfactory reproduction of color density as appropriate for the contrast of originals even if they have low density.

What is claimed is:

1. An image forming apparatus comprising:
   at least two sensors for the light of each of at least one of three primary colors for measuring the reflected light from an original, said sensors having sensitivity peaks at different wavelengths within the wavelength region of the light of said at least one primary color,
   means for identifying the type of said original by the values of measurements with said sensors, and
   means for forming an image in accordance with the so identified type of original, identification of said original being performed in such a way that color photographic originals are distinguished from color printed originals and black-and-white originals based on the value of a single discriminant function that uses said plural values of measurements as parameters for said discriminant function.

2. An image forming apparatus according to claim 1 wherein said original is a color original.

3. An image forming apparatus according to claim 1 wherein said three primary colors are red, green and blue.

4. An image forming apparatus according to claim 1 wherein a total of six sensors are used, two being dedicated to each of the three primary colors.

5. An image forming apparatus according to claim 4 wherein said six sensors consist of two sensors having sensitivity peaks at 400±30 nm and 450±30 nm within the wavelength region of the blue light, two sensors having sensitivity peaks at 540±15 nm and 570±15 nm within the wavelength region of the green light, and two sensors having sensitivity peaks at 630±40 nm and 700±40 nm within the wavelength region of the red light.

6. An image forming apparatus according to claim 1 wherein said discriminant function is a linear discriminant function.

7. An image forming apparatus according to claim 1 wherein said discriminant function is of the second order.

8. An image forming apparatus comprising:
   means for measuring the reflected light from a predetermined region of photometry including an original;
   means for distinguishing color photographic originals from color printed originals and black-and-white originals on the basis of the obtained values of photometric measurements,
   means for correcting image forming conditions of said apparatus based on the size and the type of original by performing mathematical operations only on photometric values from which photometric values below a predetermined low level and/or those values exceeding a predetermined high level have been excluded, and
   means for forming an image in accordance with the identified type of original.

9. An image forming apparatus according to claim 8 wherein said means for measuring comprises a platen glass on which the original is disposed and said region of photometry is the range over which the platen glass carrying the original is prescanned.

10. An image forming apparatus according to claim 8 wherein said original is a color original.

11. An image forming apparatus according to claim 8 wherein said values of photometric measurements are obtained by using, for the light of each of at least one of the three primary colors, at least two sensors having sensitivity peaks at different wavelength within the wavelength region of the light of one primary color.

12. An image forming apparatus according to claim 8 wherein said three primary colors are red, green and blue.

13. An image forming apparatus according to claim 11 wherein said values of photometric measurements are obtained with a total of six sensors, two of which are dedicated to each of the three primary colors.

14. An image forming apparatus according to claim 13 wherein said six sensors consist of two sensors having sensitivity peaks at 400±30 nm and 450±30 nm within the wavelength region of the blue light, two sensors having sensitivity peaks at 540±15 nm and 570±15 nm within the wavelength region of the green light, and two sensors having sensitivity peaks at 630±40 nm and 700±40 nm within the wavelength region of the red light.

15. An image forming apparatus according to claims 8 wherein said mathematical operations for identifying the type of original are performed to calculate the value of a discriminant function which uses said values of photometric measurements as parameters.

16. An image forming apparatus according to claim 15 wherein said discriminant function is a linear discriminant function.

17. An image forming apparatus according to claims 15 wherein said discriminant function is of the second order.

18. An image forming apparatus which applies light beams to the image of a color original, with the reflected light being used to form a color image on a light-sensitive material by imagewise exposure, which image is then rendered visible as a reproduced color image, the improvement comprising:
    means for reading information from the image of the color original and obtaining a color density distribution of the original image for the light of each of three primary colors,
    means for identifying a low-density, low-contrast original by means of discriminant formulas containing a plurality of parameters obtained from said color density distributions, comprising image area density, background density and the proportion of the background area, and
    means for performing a predetermined density correction for the so identified low-density, low-contrast original.

19. An image forming apparatus according to claim 18 wherein said three primary colors are red, green and blue.

20. An image forming apparatus according to claim 18 wherein photometry is performed at a predetermined number of measuring locations at give intervals in the scanning direction.

* * * * *

UNITED STATES PATENT AND TRADEMARK OFFICE
CERTIFICATE OF CORRECTION

PATENT NO. : 5,053,808
DATED : October 1, 1991
INVENTOR(S) : Atsushi Takagi It is certified that error appears in the above-identified patent and that said Letters Patent is hereby corrected as shown below:

On the Title page, item [30], insert as follows: Under Foreign Application priority Data,

```
Sept. 28, 1988 [JP] Japan....63-243603
Sept. 28, 1988 [JP] Japan....63-243609
Sept. 28, 1988 [JP] Japan....63-243610
Dec.  29, 1988 [JP] Japan....63-334284
Feb.  20, 1989 [JP] Japan....1-40007
```

Column 38, line 10, change "claims" to --claim--;
           line 18, change "claims" to --claim--.

Signed and Sealed this

Ninth Day of November, 1993

Attest:

*Attesting Officer*

BRUCE LEHMAN
*Commissioner of Patents and Trademarks*